US008127366B2

(12) United States Patent
Vainstein et al.

(10) Patent No.: US 8,127,366 B2
(45) Date of Patent: Feb. 28, 2012

(54) METHOD AND APPARATUS FOR TRANSITIONING BETWEEN STATES OF SECURITY POLICIES USED TO SECURE ELECTRONIC DOCUMENTS

(75) Inventors: Klimenty Vainstein, Cupertino, CA (US); Satyajit Nath, Cupertino, CA (US); Michael Michio Ouye, Mountain View, CA (US)

(73) Assignee: Guardian Data Storage, LLC, Wilmington, DE (US)

(*) Notice: Subject to any disclaimer, the term of this patent is extended or adjusted under 35 U.S.C. 154(b) by 936 days.

(21) Appl. No.: 10/676,474

(22) Filed: Sep. 30, 2003

(65) Prior Publication Data

US 2005/0071275 A1    Mar. 31, 2005

(51) Int. Cl.
*G06F 17/30* (2006.01)
(52) U.S. Cl. .............................................. 726/27; 726/1
(58) Field of Classification Search .................. 726/1, 2, 726/26–30; 705/51
See application file for complete search history.

(56) References Cited

U.S. PATENT DOCUMENTS

| 4,203,166 A | 5/1980 | Ehrsam et al. |
| 4,238,854 A | 12/1980 | Ehrsam et al. |
| 4,423,387 A | 12/1983 | Sempel |
| 4,734,568 A | 3/1988 | Watanabe |
| 4,757,533 A | 7/1988 | Allen et al. |
| 4,796,220 A | 1/1989 | Wolfe |
| 4,799,258 A | 1/1989 | Davies |
| 4,827,508 A | 5/1989 | Shear |
| 4,887,204 A | 12/1989 | Johnson et al. |
| 4,888,800 A | 12/1989 | Marshall et al. |
| 4,912,552 A | 3/1990 | Allison et al. |
| 4,972,472 A | 11/1990 | Brown et al. |
| 5,032,979 A | 7/1991 | Hecht et al. |
| 5,052,040 A | 9/1991 | Preston et al. |
| 5,058,164 A | 10/1991 | Elmer et al. |
| 5,144,660 A | 9/1992 | Rose |
| 5,204,897 A | 4/1993 | Wyman |

(Continued)

FOREIGN PATENT DOCUMENTS

EP    0 672 991 A2    9/1995

(Continued)

OTHER PUBLICATIONS

"Affect," The American Heritage Dictionary of the English Language, Fourth Edition, Houghton Mifflin Company, 2002. Retrieved May 4, 2006 from http://dictionary.reference.com/search?q=affect.

(Continued)

*Primary Examiner* — Edward Zee
(74) *Attorney, Agent, or Firm* — Sterne, Kessler, Goldstein & Fox P.L.L.C.

(57) ABSTRACT

Techniques for dynamically altering security criteria used in a file security system are disclosed. The security criteria pertains to keys (or ciphers) used by the file security system to encrypt electronic files to be secured or to decrypt electronic files already secured. The security criteria can, among other things, include keys that are required to gain access to electronic files. Here, the keys can be changed automatically as electronic files transition between different states of a process-driven security policy. The dynamic alteration of security criteria enhances the flexibility and robustness of the security system. In other words, access restrictions on electronic files can be dependent on the state of the process-driven security policy and enforced in conjunction with one or more cryptographic methods.

28 Claims, 13 Drawing Sheets

U.S. PATENT DOCUMENTS

| | | | |
|---|---|---|---|
| 5,212,788 A | 5/1993 | Lomet et al. | |
| 5,220,657 A | 6/1993 | Bly et al. | |
| 5,235,641 A | 8/1993 | Nozawa et al. | |
| 5,247,575 A | 9/1993 | Sprague et al. | |
| 5,267,313 A | 11/1993 | Hirata | |
| 5,276,735 A | 1/1994 | Boebert et al. | |
| 5,301,247 A | 4/1994 | Rasmussen et al. | |
| 5,319,705 A | 6/1994 | Halter et al. | |
| 5,369,702 A | 11/1994 | Shanton | |
| 5,375,169 A | 12/1994 | Seheidt et al. | |
| 5,404,404 A | 4/1995 | Novorita | |
| 5,406,628 A | 4/1995 | Beller et al. | |
| 5,414,852 A | 5/1995 | Kramer et al. | |
| 5,434,918 A | 7/1995 | Kung et al. | |
| 5,461,710 A | 10/1995 | Bloomfield et al. | |
| 5,467,342 A | 11/1995 | Logston et al. | |
| 5,495,533 A | 2/1996 | Linehan et al. | |
| 5,497,422 A | 3/1996 | Tysen et al. | |
| 5,499,297 A | 3/1996 | Boebert | |
| 5,502,766 A | 3/1996 | Boebert et al. | |
| 5,535,375 A | 7/1996 | Eshel et al. | |
| 5,557,765 A | 9/1996 | Lipner et al. | |
| 5,570,108 A | 10/1996 | McLaughlin et al. | |
| 5,584,023 A | 12/1996 | Hsu | |
| 5,600,722 A | 2/1997 | Yamaguchi et al. | |
| 5,606,663 A | 2/1997 | Kadooka | |
| 5,619,576 A | 4/1997 | Shaw | |
| 5,638,501 A | 6/1997 | Gough et al. | |
| 5,640,388 A | 6/1997 | Woodhead et al. | |
| 5,655,119 A | 8/1997 | Davy | |
| 5,661,668 A | 8/1997 | Yemini et al. | |
| 5,661,806 A | 8/1997 | Nevoux et al. | |
| 5,671,412 A | 9/1997 | Christiano | |
| 5,673,316 A | 9/1997 | Auerbach et al. | |
| 5,677,953 A | 10/1997 | Dolphin | |
| 5,680,452 A | 10/1997 | Shanton | |
| 5,682,537 A | 10/1997 | Davies et al. | |
| 5,684,987 A | 11/1997 | Mamiya et al. | |
| 5,689,688 A | 11/1997 | Strong et al. | |
| 5,689,718 A | 11/1997 | Sakurai et al. | |
| 5,699,428 A | 12/1997 | McDonnal et al. | |
| 5,708,709 A | 1/1998 | Rose | |
| 5,715,403 A | 2/1998 | Stefik | |
| 5,717,755 A | 2/1998 | Shanton | |
| 5,719,941 A | 2/1998 | Swift et al. | |
| 5,720,033 A | 2/1998 | Deo | |
| 5,729,734 A | 3/1998 | Parker et al. | |
| 5,732,265 A | 3/1998 | Dewitt et al. | |
| 5,745,573 A | 4/1998 | Lipner et al. | |
| 5,745,750 A | 4/1998 | Porcaro | |
| 5,748,736 A | 5/1998 | Mittra | |
| 5,751,287 A | 5/1998 | Hahn et al. | |
| 5,757,920 A | 5/1998 | Misra et al. | |
| 5,765,152 A * | 6/1998 | Erickson | 707/9 |
| 5,768,381 A | 6/1998 | Hawthorne | |
| 5,778,065 A | 7/1998 | Hauser et al. | |
| 5,778,350 A | 7/1998 | Adams et al. | |
| 5,781,711 A | 7/1998 | Austin et al. | |
| 5,787,169 A | 7/1998 | Eldridge et al. | |
| 5,787,173 A | 7/1998 | Seheidt et al. | |
| 5,787,175 A * | 7/1998 | Carter | 713/165 |
| 5,790,789 A | 8/1998 | Suarez | |
| 5,790,790 A | 8/1998 | Smith et al. | |
| 5,813,009 A | 9/1998 | Johnson et al. | |
| 5,821,933 A | 10/1998 | Keller et al. | |
| 5,825,876 A | 10/1998 | Peterson | |
| 5,835,592 A | 11/1998 | Chang et al. | |
| 5,835,601 A | 11/1998 | Shimbo et al. | |
| 5,850,443 A | 12/1998 | Van Oorschot et al. | |
| 5,857,189 A | 1/1999 | Riddle | |
| 5,862,325 A | 1/1999 | Reed et al. | |
| 5,870,468 A | 2/1999 | Harrison | |
| 5,870,477 A | 2/1999 | Sasaki et al. | |
| 5,881,287 A | 3/1999 | Mast | |
| 5,892,900 A | 4/1999 | Ginter et al. | |
| 5,893,084 A | 4/1999 | Morgan et al. | |
| 5,898,781 A | 4/1999 | Shanton | |
| 5,922,073 A | 7/1999 | Shimada | |
| 5,923,754 A | 7/1999 | Angelo et al. | |
| 5,933,498 A | 8/1999 | Schneck et al. | |
| 5,944,794 A | 8/1999 | Okamoto et al. | |
| 5,953,419 A | 9/1999 | Lohstroh et al. | |
| 5,968,177 A | 10/1999 | Batten-Carew et al. | |
| 5,970,502 A | 10/1999 | Salkewicz et al. | |
| 5,978,802 A | 11/1999 | Hurvig | |
| 5,987,440 A | 11/1999 | O'Neil et al. | |
| 5,991,879 A | 11/1999 | Still | |
| 5,999,907 A | 12/1999 | Donner | |
| 6,011,847 A | 1/2000 | Follendore, III | |
| 6,014,730 A | 1/2000 | Ohtsu | |
| 6,023,506 A | 2/2000 | Ote et al. | |
| 6,031,584 A | 2/2000 | Gray | |
| 6,032,216 A | 2/2000 | Schmuck et al. | |
| 6,035,404 A | 3/2000 | Zhao | |
| 6,038,322 A | 3/2000 | Harkins | |
| 6,044,155 A | 3/2000 | Thomlinson et al. | |
| 6,055,314 A | 4/2000 | Spies et al. | |
| 6,058,424 A | 5/2000 | Dixon et al. | |
| 6,061,790 A | 5/2000 | Bodnar | |
| 6,069,057 A | 5/2000 | Wu | |
| 6,070,244 A | 5/2000 | Orchier et al. | |
| 6,085,323 A | 7/2000 | Shimizu et al. | |
| 6,088,717 A | 7/2000 | Reed et al. | |
| 6,088,805 A | 7/2000 | Davis et al. | |
| 6,098,056 A | 8/2000 | Rusnak et al. | |
| 6,101,507 A | 8/2000 | Cane et al. | |
| 6,105,131 A | 8/2000 | Carroll | |
| 6,122,630 A | 9/2000 | Strickler et al. | |
| 6,134,327 A | 10/2000 | Van Oorschot | |
| 6,134,658 A | 10/2000 | Multerer et al. | |
| 6,134,660 A | 10/2000 | Boneh et al. | |
| 6,134,664 A | 10/2000 | Walker | |
| 6,141,754 A | 10/2000 | Choy | |
| 6,145,084 A | 11/2000 | Zuili | |
| 6,148,338 A | 11/2000 | Lachelt et al. | |
| 6,158,010 A | 12/2000 | Moriconi et al. | |
| 6,161,139 A | 12/2000 | Win et al. | |
| 6,182,142 B1 | 1/2001 | Win et al. | |
| 6,185,684 B1 | 2/2001 | Pravetz et al. | |
| 6,192,408 B1 | 2/2001 | Vahalia et al. | |
| 6,199,070 B1 | 3/2001 | Polo-Wood et al. | |
| 6,205,549 B1 * | 3/2001 | Pravetz | 713/182 |
| 6,212,561 B1 | 4/2001 | Sitaraman et al. | |
| 6,223,285 B1 | 4/2001 | Komuro et al. | |
| 6,226,618 B1 | 5/2001 | Downs et al. | |
| 6,226,745 B1 | 5/2001 | Wiederhold | |
| 6,240,188 B1 | 5/2001 | Dondeti et al. | |
| 6,249,755 B1 | 6/2001 | Yemini et al. | |
| 6,249,873 B1 | 6/2001 | Richard et al. | |
| 6,253,193 B1 | 6/2001 | Ginter et al. | |
| 6,260,040 B1 | 7/2001 | Kauffman et al. | |
| 6,260,141 B1 | 7/2001 | Park | |
| 6,263,348 B1 | 7/2001 | Kathrow et al. | |
| 6,266,420 B1 | 7/2001 | Langford et al. | |
| 6,272,631 B1 | 8/2001 | Thomlinson et al. | |
| 6,272,632 B1 | 8/2001 | Carman et al. | |
| 6,282,649 B1 | 8/2001 | Lambert et al. | |
| 6,289,450 B1 | 9/2001 | Pensak et al. | |
| 6,289,458 B1 | 9/2001 | Garg et al. | |
| 6,292,895 B1 | 9/2001 | Baltzley | |
| 6,292,899 B1 | 9/2001 | McBride | |
| 6,295,361 B1 | 9/2001 | Kadansky et al. | |
| 6,299,069 B1 | 10/2001 | Shona | |
| 6,301,614 B1 | 10/2001 | Najork et al. | |
| 6,308,256 B1 | 10/2001 | Folmsbee | |
| 6,308,273 B1 | 10/2001 | Goertzel et al. | |
| 6,314,408 B1 | 11/2001 | Salas et al. | |
| 6,314,409 B2 | 11/2001 | Schneck et al. | |
| 6,317,777 B1 | 11/2001 | Skarbo et al. | |
| 6,332,025 B2 | 12/2001 | Takahashi et al. | |
| 6,336,114 B1 | 1/2002 | Garrison | |
| 6,339,423 B1 | 1/2002 | Sampson et al. | |
| 6,339,825 B2 | 1/2002 | Pensak et al. | |
| 6,341,164 B1 * | 1/2002 | Dilkie et al. | 380/278 |
| 6,343,316 B1 | 1/2002 | Sakata | |
| 6,347,374 B1 | 2/2002 | Drake et al. | |
| 6,349,337 B1 | 2/2002 | Parsons et al. | |

| Patent | Date | Inventor |
|---|---|---|
| 6,351,813 B1 * | 2/2002 | Mooney et al. ............... 713/185 |
| 6,356,903 B1 | 3/2002 | Baxter et al. |
| 6,356,941 B1 | 3/2002 | Cohen |
| 6,357,010 B1 | 3/2002 | Viets et al. |
| 6,363,480 B1 | 3/2002 | Perlman |
| 6,366,298 B1 | 4/2002 | Haitsuka et al. |
| 6,370,249 B1 | 4/2002 | Van Oorschot |
| 6,381,698 B1 | 4/2002 | Devanbu et al. |
| 6,385,644 B1 | 5/2002 | Devine et al. |
| 6,389,433 B1 | 5/2002 | Bolosky et al. |
| 6,389,538 B1 | 5/2002 | Gruse et al. |
| 6,393,420 B1 | 5/2002 | Peters |
| 6,405,315 B1 | 6/2002 | Burns et al. |
| 6,405,318 B1 | 6/2002 | Rowland |
| 6,408,404 B1 | 6/2002 | Ladwig |
| 6,421,714 B1 | 7/2002 | Rai et al. |
| 6,442,688 B1 | 8/2002 | Moses et al. |
| 6,442,695 B1 | 8/2002 | Dutcher et al. |
| 6,446,090 B1 | 9/2002 | Hart |
| 6,449,721 B1 | 9/2002 | Pensak et al. |
| 6,453,353 B1 | 9/2002 | Win et al. |
| 6,453,419 B1 | 9/2002 | Flint et al. |
| 6,466,476 B1 | 10/2002 | Wong et al. |
| 6,466,932 B1 | 10/2002 | Dennis et al. |
| 6,477,544 B1 | 11/2002 | Bolosky et al. |
| 6,487,662 B1 | 11/2002 | Kharon et al. |
| 6,490,680 B1 | 12/2002 | Scheidt et al. |
| 6,505,300 B2 * | 1/2003 | Chan et al. ............... 713/164 |
| 6,510,349 B1 | 1/2003 | Schneck et al. |
| 6,519,700 B1 | 2/2003 | Ram et al. |
| 6,529,956 B1 | 3/2003 | Smith et al. |
| 6,530,020 B1 | 3/2003 | Aoki |
| 6,530,024 B1 | 3/2003 | Proctor |
| 6,542,608 B2 | 4/2003 | Scheidt et al. |
| 6,549,623 B1 | 4/2003 | Scheidt et al. |
| 6,550,011 B1 | 4/2003 | Sims |
| 6,557,039 B1 | 4/2003 | Leong et al. |
| 6,567,914 B1 * | 5/2003 | Just et al. ............... 713/160 |
| 6,571,291 B1 | 5/2003 | Chow |
| 6,574,733 B1 | 6/2003 | Langford |
| 6,584,466 B1 * | 6/2003 | Serbinis et al. ............... 707/10 |
| 6,587,878 B1 | 7/2003 | Merriam |
| 6,587,946 B1 | 7/2003 | Jakobsson |
| 6,588,673 B1 | 7/2003 | Chan et al. |
| 6,591,295 B1 | 7/2003 | Diamond et al. |
| 6,594,662 B1 | 7/2003 | Sieffert et al. |
| 6,598,161 B1 | 7/2003 | Kluttz et al. |
| 6,601,170 B1 | 7/2003 | Wallace, Jr. |
| 6,603,857 B1 | 8/2003 | Batten-Carew et al. |
| 6,608,636 B1 | 8/2003 | Roseman |
| 6,611,599 B2 | 8/2003 | Natarajan |
| 6,611,846 B1 | 8/2003 | Stoodley |
| 6,615,349 B1 | 9/2003 | Hair |
| 6,615,350 B1 | 9/2003 | Schell et al. |
| 6,625,650 B2 | 9/2003 | Stelliga |
| 6,625,734 B1 | 9/2003 | Marvit et al. |
| 6,629,140 B1 | 9/2003 | Fertell et al. |
| 6,629,243 B1 | 9/2003 | Kleinman et al. |
| 6,633,311 B1 | 10/2003 | Douvikas et al. |
| 6,640,307 B2 | 10/2003 | Viets et al. |
| 6,646,515 B2 | 11/2003 | Jun et al. |
| 6,647,388 B2 | 11/2003 | Numao et al. |
| 6,678,835 B1 | 1/2004 | Shah et al. |
| 6,683,954 B1 | 1/2004 | Searle |
| 6,687,822 B1 | 2/2004 | Jakobsson |
| 6,693,652 B1 | 2/2004 | Barrus et al. |
| 6,698,022 B1 | 2/2004 | Wu |
| 6,711,683 B1 | 3/2004 | Laczko et al. |
| 6,718,361 B1 | 4/2004 | Basani et al. |
| 6,735,701 B1 | 5/2004 | Jacobson |
| 6,738,908 B1 | 5/2004 | Bonn et al. |
| 6,751,573 B1 | 6/2004 | Burch |
| 6,754,657 B2 | 6/2004 | Lomet |
| 6,754,665 B1 | 6/2004 | Futagami et al. |
| 6,775,779 B1 | 8/2004 | England et al. |
| 6,779,031 B1 | 8/2004 | Picher-Dempsey |
| 6,782,403 B1 * | 8/2004 | Kino et al. ............... 707/203 |
| 6,801,999 B1 | 10/2004 | Venkatesan et al. |
| 6,807,534 B1 | 10/2004 | Erickson |
| 6,807,636 B2 | 10/2004 | Hartman et al. |
| 6,810,389 B1 | 10/2004 | Meyer |
| 6,810,479 B1 | 10/2004 | Barlow et al. |
| 6,816,871 B2 | 11/2004 | Lee |
| 6,816,969 B2 | 11/2004 | Miyazaki et al. |
| 6,826,698 B1 | 11/2004 | Minkin et al. |
| 6,834,333 B2 | 12/2004 | Yoshino et al. |
| 6,834,341 B1 | 12/2004 | Bahl et al. |
| 6,842,825 B2 | 1/2005 | Geiner et al. |
| 6,845,452 B1 | 1/2005 | Roddy et al. |
| 6,851,050 B2 | 2/2005 | Singhal et al. |
| 6,862,103 B1 | 3/2005 | Miura et al. |
| 6,865,555 B2 | 3/2005 | Novak |
| 6,870,920 B2 | 3/2005 | Henits |
| 6,874,139 B2 | 3/2005 | Krueger et al. |
| 6,877,010 B2 | 4/2005 | Smith-Semedo et al. |
| 6,877,136 B2 | 4/2005 | Bess et al. |
| 6,882,994 B2 | 4/2005 | Yoshimura et al. |
| 6,889,210 B1 | 5/2005 | Vainstein |
| 6,891,953 B1 | 5/2005 | DeMello et al. |
| 6,892,201 B2 | 5/2005 | Brown et al. |
| 6,892,306 B1 | 5/2005 | En-Seung et al. |
| 6,898,627 B1 | 5/2005 | Sekiguchi |
| 6,907,034 B1 | 6/2005 | Begis |
| 6,909,708 B1 | 6/2005 | Krishnaswamy et al. |
| 6,915,425 B2 | 7/2005 | Xu et al. |
| 6,915,434 B1 * | 7/2005 | Kuroda et al. ............... 713/193 |
| 6,915,435 B1 | 7/2005 | Merriam |
| 6,920,558 B2 | 7/2005 | Sames et al. |
| 6,922,785 B1 | 7/2005 | Brewer et al. |
| 6,924,425 B2 | 8/2005 | Naples et al. |
| 6,931,450 B2 | 8/2005 | Howard et al. |
| 6,931,530 B2 | 8/2005 | Pham et al. |
| 6,931,597 B1 | 8/2005 | Prakash |
| 6,938,042 B2 | 8/2005 | Aboulhosn et al. |
| 6,938,156 B2 | 8/2005 | Wheeler et al. |
| 6,941,355 B1 | 9/2005 | Donaghey et al. |
| 6,941,456 B2 | 9/2005 | Wilson |
| 6,941,472 B2 * | 9/2005 | Moriconi et al. ............... 726/11 |
| 6,944,183 B1 | 9/2005 | Iyer et al. |
| 6,947,556 B1 | 9/2005 | Matyas, Jr. et al. |
| 6,950,818 B2 | 9/2005 | Dennis et al. |
| 6,950,936 B2 | 9/2005 | Subramaniam et al. |
| 6,950,941 B1 | 9/2005 | Lee et al. |
| 6,950,943 B1 | 9/2005 | Bacha et al. |
| 6,952,780 B2 | 10/2005 | Olsen et al. |
| 6,957,261 B2 | 10/2005 | Lortz |
| 6,959,308 B2 | 10/2005 | Gramsamer et al. |
| 6,961,849 B1 | 11/2005 | Davis et al. |
| 6,961,855 B1 | 11/2005 | Rich et al. |
| 6,968,060 B1 | 11/2005 | Pinkas |
| 6,968,456 B1 | 11/2005 | Tripathi et al. |
| 6,971,018 B1 | 11/2005 | Witt et al. |
| 6,976,259 B1 * | 12/2005 | Dutta et al. ............... 719/310 |
| 6,978,366 B1 | 12/2005 | Ignatchenko et al. |
| 6,978,376 B2 | 12/2005 | Giroux et al. |
| 6,978,377 B1 | 12/2005 | Asano et al. |
| 6,987,752 B1 | 1/2006 | Sarraf et al. |
| 6,988,133 B1 | 1/2006 | Zavalkovsky et al. |
| 6,988,199 B2 | 1/2006 | Toh et al. |
| 6,990,441 B1 | 1/2006 | Bolme et al. |
| 6,993,135 B2 | 1/2006 | Ishibashi |
| 6,996,718 B1 | 2/2006 | Henry et al. |
| 7,000,150 B1 | 2/2006 | Zunino et al. |
| 7,003,116 B2 | 2/2006 | Riedel et al. |
| 7,003,117 B2 | 2/2006 | Kacker et al. |
| 7,003,560 B1 | 2/2006 | Mullen et al. |
| 7,003,661 B2 | 2/2006 | Beattie et al. |
| 7,010,689 B1 | 3/2006 | Matyas et al. |
| 7,010,809 B2 | 3/2006 | Hori et al. |
| 7,013,332 B2 | 3/2006 | Friedel et al. |
| 7,013,485 B2 | 3/2006 | Brown et al. |
| 7,020,645 B2 | 3/2006 | Bisbee et al. |
| 7,024,427 B2 | 4/2006 | Bobbitt et al. |
| 7,035,854 B2 | 4/2006 | Hsiao et al. |
| 7,035,910 B1 | 4/2006 | Dutta et al. |
| 7,043,637 B2 | 5/2006 | Bolosky et al. |
| 7,046,807 B2 | 5/2006 | Hirano et al. |
| 7,047,404 B1 | 5/2006 | Doonan et al. |

| Patent | Type | Date | Inventor |
|---|---|---|---|
| 7,051,213 | B1 | 5/2006 | Kobayashi et al. |
| 7,058,696 | B1 | 6/2006 | Phillips et al. |
| 7,058,978 | B2 | 6/2006 | Feuerstein et al. |
| 7,073,063 | B2 | 7/2006 | Peinado |
| 7,073,073 | B1 | 7/2006 | Nonaka et al. |
| 7,076,067 | B2 | 7/2006 | Raike et al. |
| 7,076,312 | B2 | 7/2006 | Law et al. |
| 7,076,469 | B2 | 7/2006 | Schreiber et al. |
| 7,076,633 | B2 | 7/2006 | Tormasov et al. |
| 7,080,077 | B2 | 7/2006 | Ramamurthy et al. |
| 7,095,853 | B2 | 8/2006 | Morishita |
| 7,096,266 | B2 | 8/2006 | Lewin et al. |
| 7,099,926 | B1 | 8/2006 | Ims et al. |
| 7,103,911 | B2 | 9/2006 | Spies et al. |
| 7,107,185 | B1 | 9/2006 | Yemini et al. |
| 7,107,269 | B2 | 9/2006 | Arlein et al. |
| 7,107,416 | B2 | 9/2006 | Stuart et al. |
| 7,113,594 | B2 | 9/2006 | Boneh et al. |
| 7,116,785 | B2 | 10/2006 | Okaue |
| 7,117,322 | B2 | 10/2006 | Hochberg et al. |
| 7,120,635 | B2 | 10/2006 | Bhide et al. |
| 7,120,757 | B2 | 10/2006 | Tsuge |
| 7,124,164 | B1 | 10/2006 | Chemtob |
| 7,126,957 | B1 | 10/2006 | Isukapalli et al. |
| 7,130,964 | B1 | 10/2006 | Ims et al. |
| 7,131,071 | B2 | 10/2006 | Gune et al. |
| 7,134,041 | B2 | 11/2006 | Murray et al. |
| 7,136,903 | B1 | 11/2006 | Phillips et al. |
| 7,139,399 | B1 | 11/2006 | Zimmermann |
| 7,140,044 | B2 | 11/2006 | Redlich et al. |
| 7,145,898 | B1 | 12/2006 | Elliott |
| 7,146,388 | B2 | 12/2006 | Stakutis et al. |
| 7,146,498 | B1 | 12/2006 | Takechi et al. |
| 7,159,036 | B2 | 1/2007 | Hinchliffe et al. |
| 7,168,094 | B1 | 1/2007 | Fredell |
| 7,171,557 | B2 | 1/2007 | Kallahalla et al. |
| 7,174,563 | B1 | 2/2007 | Brownlie et al. |
| 7,177,427 | B1 | 2/2007 | Komuro et al. |
| 7,177,839 | B1 | 2/2007 | Claxton et al. |
| 7,178,033 | B1 | 2/2007 | Garcia |
| 7,181,017 | B1 | 2/2007 | Nagel et al. |
| 7,185,364 | B2 | 2/2007 | Knouse et al. |
| 7,187,033 | B2 | 3/2007 | Pendharkar |
| 7,188,181 | B1 | 3/2007 | Squier et al. |
| 7,194,764 | B2 | 3/2007 | Martherus et al. |
| 7,197,638 | B1 | 3/2007 | Grawrock et al. |
| 7,200,747 | B2 | 4/2007 | Kallahalla et al. |
| 7,203,317 | B2 | 4/2007 | Kallahalla et al. |
| 7,203,968 | B2 | 4/2007 | Asano et al. |
| 7,219,230 | B2 | 5/2007 | Riedel et al. |
| 7,224,795 | B2 | 5/2007 | Takada et al. |
| 7,225,256 | B2 | 5/2007 | Villavicencio |
| 7,227,953 | B2 | 6/2007 | Shida |
| 7,233,948 | B1 | 6/2007 | Shamoon et al. |
| 7,237,002 | B1 | 6/2007 | Estrada et al. |
| 7,249,044 | B2 | 7/2007 | Kumar et al. |
| 7,249,251 | B2 | 7/2007 | Todd et al. |
| 7,260,555 | B2 | 8/2007 | Rossmann et al. |
| 7,265,764 | B2 | 9/2007 | Alben et al. |
| 7,266,684 | B2 | 9/2007 | Jancula |
| 7,280,658 | B2 | 10/2007 | Amini et al. |
| 7,281,272 | B1 | 10/2007 | Rubin et al. |
| 7,287,055 | B2 | 10/2007 | Smith et al. |
| 7,287,058 | B2 | 10/2007 | Loveland et al. |
| 7,290,148 | B2 | 10/2007 | Tozawa et al. |
| 7,308,702 | B1 | 12/2007 | Thomsen et al. |
| 7,313,824 | B1 | 12/2007 | Bala et al. |
| 7,319,752 | B2 | 1/2008 | Asano et al. |
| 7,340,600 | B1 | 3/2008 | Corella |
| 7,343,488 | B2 | 3/2008 | Yadav |
| 7,359,517 | B1 | 4/2008 | Rowe |
| 7,362,868 | B2 | 4/2008 | Madoukh et al. |
| 7,380,120 | B1 | 5/2008 | Garcia |
| 7,383,586 | B2 | 6/2008 | Cross et al. |
| 7,386,529 | B2 | 6/2008 | Kiessig et al. |
| 7,386,599 | B1 | 6/2008 | Piersol et al. |
| 7,401,220 | B2 | 7/2008 | Bolosky et al. |
| 7,406,596 | B2 | 7/2008 | Tararukhina et al. |
| 7,415,608 | B2 | 8/2008 | Bolosky et al. |
| 7,434,048 | B1 | 10/2008 | Shapiro et al. |
| 7,454,612 | B2 | 11/2008 | Bolosky et al. |
| 7,461,157 | B2 | 12/2008 | Ahlard et al. |
| 7,461,405 | B2 | 12/2008 | Boudreault et al. |
| 7,478,243 | B2 | 1/2009 | Bolosky et al. |
| 7,478,418 | B2 | 1/2009 | Supramaniam et al. |
| 7,484,245 | B1 | 1/2009 | Friedman et al. |
| 7,496,959 | B2 | 2/2009 | Adelstein et al. |
| 7,509,492 | B2 | 3/2009 | Boyen et al. |
| 7,512,810 | B1 | 3/2009 | Ryan |
| 7,539,867 | B2 | 5/2009 | Bolosky et al. |
| 7,555,558 | B1 | 6/2009 | Kenrich et al. |
| 7,562,232 | B2 | 7/2009 | Zuili et al. |
| 7,565,683 | B1 | 7/2009 | Huang et al. |
| 7,631,184 | B2 | 12/2009 | Ryan |
| 7,681,034 | B1 | 3/2010 | Lee et al. |
| 7,698,230 | B1 | 4/2010 | Brown et al. |
| 7,702,909 | B2 | 4/2010 | Vainstein |
| 7,703,140 | B2 | 4/2010 | Nath et al. |
| 7,707,427 | B1 | 4/2010 | Kenrich et al. |
| 7,729,995 | B1 | 6/2010 | Alain et al. |
| 7,730,543 | B1 | 6/2010 | Nath et al. |
| 7,748,045 | B2 | 6/2010 | Kenrich et al. |
| 2001/0000265 | A1 | 4/2001 | Schreiber et al. |
| 2001/0011254 | A1 | 8/2001 | Clark |
| 2001/0014882 | A1 | 8/2001 | Stefik et al. |
| 2001/0018743 | A1 | 8/2001 | Morishita |
| 2001/0021255 | A1 | 9/2001 | Ishibashi |
| 2001/0021926 | A1 | 9/2001 | Schnek et al. |
| 2001/0023421 | A1 | 9/2001 | Numao et al. |
| 2001/0032181 | A1 | 10/2001 | Jakstadt et al. |
| 2001/0033611 | A1 | 10/2001 | Grimwood et al. |
| 2001/0034839 | A1 | 10/2001 | Karjoth et al. |
| 2001/0042110 | A1 | 11/2001 | Furusawa et al. |
| 2001/0044903 | A1 | 11/2001 | Yamamoto et al. |
| 2001/0056541 | A1 | 12/2001 | Matsuzaki et al. |
| 2001/0056550 | A1 | 12/2001 | Lee |
| 2002/0003886 | A1 | 1/2002 | Hillegass et al. |
| 2002/0007335 | A1 | 1/2002 | Millard et al. |
| 2002/0010679 | A1 | 1/2002 | Felsher |
| 2002/0013772 | A1 | 1/2002 | Peinado |
| 2002/0016921 | A1 | 2/2002 | Olsen et al. |
| 2002/0016922 | A1 | 2/2002 | Richards et al. |
| 2002/0023208 | A1 | 2/2002 | Jancula |
| 2002/0026321 | A1 | 2/2002 | Faris et al. |
| 2002/0027886 | A1 | 3/2002 | Fischer et al. |
| 2002/0029340 | A1 | 3/2002 | Pensak et al. |
| 2002/0031230 | A1 | 3/2002 | Sweet et al. |
| 2002/0035624 | A1 | 3/2002 | Kim |
| 2002/0036984 | A1 | 3/2002 | Chiussi et al. |
| 2002/0041391 | A1 | 4/2002 | Bannai |
| 2002/0042756 | A1 | 4/2002 | Kumar et al. |
| 2002/0046350 | A1 | 4/2002 | Lordemann et al. |
| 2002/0050098 | A1 | 5/2002 | Chan |
| 2002/0052981 | A1 | 5/2002 | Yasuda |
| 2002/0056042 | A1 | 5/2002 | van der Kaay et al. |
| 2002/0062240 | A1 | 5/2002 | Morinville |
| 2002/0062245 | A1 | 5/2002 | Niu et al. |
| 2002/0062451 | A1 | 5/2002 | Scheidt et al. |
| 2002/0069077 | A1 | 6/2002 | Brophy et al. |
| 2002/0069272 | A1 | 6/2002 | Kim et al. |
| 2002/0069363 | A1 | 6/2002 | Winburn |
| 2002/0073320 | A1 | 6/2002 | Rinkevich et al. |
| 2002/0077986 | A1 | 6/2002 | Kobata et al. |
| 2002/0077988 | A1 | 6/2002 | Sasaki et al. |
| 2002/0078239 | A1 | 6/2002 | Howard et al. |
| 2002/0078361 | A1 | 6/2002 | Giroux et al. |
| 2002/0087479 | A1 | 7/2002 | Malcolm |
| 2002/0089602 | A1 | 7/2002 | Sullivan |
| 2002/0091532 | A1 | 7/2002 | Viets et al. |
| 2002/0091745 | A1 | 7/2002 | Ramamurthy et al. |
| 2002/0091928 | A1 | 7/2002 | Bouchard et al. |
| 2002/0093527 | A1 | 7/2002 | Sherlock et al. |
| 2002/0099947 | A1 | 7/2002 | Evans |
| 2002/0112035 | A1 | 8/2002 | Carey et al. |
| 2002/0112048 | A1 | 8/2002 | Gruyer et al. |
| 2002/0120851 | A1 | 8/2002 | Clarke |
| 2002/0124180 | A1 | 9/2002 | Hagman |
| 2002/0129158 | A1 | 9/2002 | Zhang et al. |

| Publication No. | Date | Inventor | Ref |
|---|---|---|---|
| 2002/0129235 A1 | 9/2002 | Okamoto et al. | |
| 2002/0133500 A1 | 9/2002 | Arlein et al. | |
| 2002/0133699 A1 | 9/2002 | Pueschel | |
| 2002/0138571 A1 | 9/2002 | Trinon et al. | |
| 2002/0138726 A1* | 9/2002 | Sames et al. | 713/166 |
| 2002/0138762 A1 | 9/2002 | Horne | |
| 2002/0143710 A1 | 10/2002 | Liu | |
| 2002/0143906 A1 | 10/2002 | Tormasov et al. | |
| 2002/0150239 A1 | 10/2002 | Carny et al. | |
| 2002/0152302 A1 | 10/2002 | Motoyama et al. | |
| 2002/0156726 A1 | 10/2002 | Kleckner et al. | |
| 2002/0157016 A1 | 10/2002 | Russell et al. | |
| 2002/0162104 A1 | 10/2002 | Raike et al. | |
| 2002/0165870 A1 | 11/2002 | Chakraborty et al. | |
| 2002/0166053 A1* | 11/2002 | Wilson | 713/189 |
| 2002/0169963 A1 | 11/2002 | Seder et al. | |
| 2002/0169965 A1 | 11/2002 | Hale et al. | |
| 2002/0172367 A1 | 11/2002 | Mulder et al. | |
| 2002/0174030 A1 | 11/2002 | Praisner et al. | |
| 2002/0174109 A1 | 11/2002 | Chandy et al. | |
| 2002/0174415 A1 | 11/2002 | Hines | |
| 2002/0176572 A1 | 11/2002 | Ananth | |
| 2002/0178271 A1* | 11/2002 | Graham et al. | 709/229 |
| 2002/0184217 A1* | 12/2002 | Bisbee et al. | 707/9 |
| 2002/0184488 A1* | 12/2002 | Amini et al. | 713/153 |
| 2002/0194484 A1 | 12/2002 | Bolosky et al. | |
| 2002/0198798 A1 | 12/2002 | Ludwig et al. | |
| 2003/0005168 A1 | 1/2003 | Leerssen et al. | |
| 2003/0009685 A1 | 1/2003 | Choo et al. | |
| 2003/0014391 A1 | 1/2003 | Evans et al. | |
| 2003/0023559 A1 | 1/2003 | Choi et al. | |
| 2003/0026431 A1 | 2/2003 | Hammersmith | |
| 2003/0028610 A1 | 2/2003 | Pearson | |
| 2003/0033528 A1 | 2/2003 | Ozog et al. | |
| 2003/0037029 A1 | 2/2003 | Holenstein et al. | |
| 2003/0037133 A1 | 2/2003 | Owens | |
| 2003/0037237 A1 | 2/2003 | Abgrall et al. | |
| 2003/0037253 A1 | 2/2003 | Blank et al. | |
| 2003/0046176 A1 | 3/2003 | Hynes | |
| 2003/0046238 A1 | 3/2003 | Nonaka et al. | |
| 2003/0046270 A1 | 3/2003 | Leung et al. | |
| 2003/0050919 A1 | 3/2003 | Brown et al. | |
| 2003/0051039 A1 | 3/2003 | Brown et al. | |
| 2003/0056139 A1 | 3/2003 | Murray et al. | |
| 2003/0061482 A1 | 3/2003 | Emmerichs | |
| 2003/0061506 A1 | 3/2003 | Cooper et al. | |
| 2003/0074580 A1 | 4/2003 | Knouse et al. | |
| 2003/0078959 A1 | 4/2003 | Yeung et al. | |
| 2003/0079175 A1* | 4/2003 | Limantsev | 715/500 |
| 2003/0081784 A1 | 5/2003 | Kallahalla et al. | |
| 2003/0081785 A1 | 5/2003 | Boneh et al. | |
| 2003/0081787 A1 | 5/2003 | Kallahalla et al. | |
| 2003/0081790 A1* | 5/2003 | Kallahalla et al. | 380/281 |
| 2003/0088517 A1 | 5/2003 | Medoff | |
| 2003/0088783 A1 | 5/2003 | DiPierro | |
| 2003/0093457 A1 | 5/2003 | Goldick | |
| 2003/0095552 A1 | 5/2003 | Bernhard et al. | |
| 2003/0099248 A1 | 5/2003 | Speciner | |
| 2003/0101072 A1 | 5/2003 | Dick et al. | |
| 2003/0110169 A1 | 6/2003 | Zuili | |
| 2003/0110266 A1 | 6/2003 | Rollins et al. | |
| 2003/0110280 A1 | 6/2003 | Hinchliffe et al. | |
| 2003/0110397 A1 | 6/2003 | Supramaniam | |
| 2003/0115146 A1 | 6/2003 | Lee et al. | |
| 2003/0115218 A1 | 6/2003 | Bobbitt et al. | |
| 2003/0115570 A1 | 6/2003 | Bisceglia | |
| 2003/0120601 A1 | 6/2003 | Ouye | |
| 2003/0120684 A1 | 6/2003 | Zuili et al. | |
| 2003/0126434 A1 | 7/2003 | Lim et al. | |
| 2003/0132949 A1 | 7/2003 | Fallon et al. | |
| 2003/0154296 A1 | 8/2003 | Noguchi et al. | |
| 2003/0154381 A1 | 8/2003 | Ouye | |
| 2003/0154396 A1 | 8/2003 | Godwin et al. | |
| 2003/0154401 A1 | 8/2003 | Hartman et al. | |
| 2003/0159048 A1 | 8/2003 | Matsumoto et al. | |
| 2003/0159066 A1 | 8/2003 | Staw et al. | |
| 2003/0163704 A1 | 8/2003 | Dick et al. | |
| 2003/0165117 A1 | 9/2003 | Garcia-Luna-Aceves et al. | |
| 2003/0172280 A1 | 9/2003 | Scheidt et al. | |
| 2003/0177070 A1 | 9/2003 | Viswanath et al. | |
| 2003/0177378 A1 | 9/2003 | Wittkotter | |
| 2003/0182310 A1 | 9/2003 | Charnock et al. | |
| 2003/0182579 A1 | 9/2003 | Leporini et al. | |
| 2003/0182584 A1 | 9/2003 | Banes et al. | |
| 2003/0191938 A1 | 10/2003 | Woods et al. | |
| 2003/0196096 A1 | 10/2003 | Sutton | |
| 2003/0197729 A1 | 10/2003 | Denoue et al. | |
| 2003/0200202 A1 | 10/2003 | Hsiao et al. | |
| 2003/0204692 A1 | 10/2003 | Tamer et al. | |
| 2003/0208485 A1 | 11/2003 | Castellanos | |
| 2003/0217264 A1 | 11/2003 | Martin et al. | |
| 2003/0217281 A1 | 11/2003 | Ryan | |
| 2003/0217282 A1 | 11/2003 | Henry | |
| 2003/0217333 A1* | 11/2003 | Smith et al. | 715/513 |
| 2003/0220999 A1 | 11/2003 | Emerson | |
| 2003/0222141 A1 | 12/2003 | Vogler et al. | |
| 2003/0226013 A1 | 12/2003 | Dutertre | |
| 2003/0233650 A1 | 12/2003 | Zaner et al. | |
| 2004/0022390 A1 | 2/2004 | McDonald et al. | |
| 2004/0025037 A1* | 2/2004 | Hair | 713/189 |
| 2004/0039781 A1 | 2/2004 | LaVallee et al. | |
| 2004/0041845 A1 | 3/2004 | Alben et al. | |
| 2004/0049702 A1 | 3/2004 | Subramaniam et al. | |
| 2004/0064507 A1 | 4/2004 | Sakata | |
| 2004/0064710 A1 | 4/2004 | Vainstein | |
| 2004/0068524 A1 | 4/2004 | Aboulhosn et al. | |
| 2004/0068664 A1 | 4/2004 | Nachenberg et al. | |
| 2004/0073660 A1 | 4/2004 | Toomey | |
| 2004/0073718 A1 | 4/2004 | Johannessen et al. | |
| 2004/0088548 A1 | 5/2004 | Smetters et al. | |
| 2004/0098580 A1* | 5/2004 | DeTreville | 713/155 |
| 2004/0103202 A1 | 5/2004 | Hildebrand et al. | |
| 2004/0103280 A1 | 5/2004 | Balfanz et al. | |
| 2004/0117371 A1* | 6/2004 | Bhide et al. | 707/9 |
| 2004/0131191 A1 | 7/2004 | Chen et al. | |
| 2004/0133544 A1 | 7/2004 | Kiessig et al. | |
| 2004/0158586 A1 | 8/2004 | Tsai | |
| 2004/0186845 A1 | 9/2004 | Fukui | |
| 2004/0193602 A1 | 9/2004 | Liu et al. | |
| 2004/0193905 A1 | 9/2004 | Lirov et al. | |
| 2004/0193912 A1* | 9/2004 | Li et al. | 713/200 |
| 2004/0199514 A1 | 10/2004 | Rosenblatt et al. | |
| 2004/0205576 A1 | 10/2004 | Chikirivao et al. | |
| 2004/0215956 A1 | 10/2004 | Venkatachary et al. | |
| 2004/0215962 A1 | 10/2004 | Douceur et al. | |
| 2004/0243853 A1 | 12/2004 | Swander et al. | |
| 2004/0254884 A1 | 12/2004 | Haber et al. | |
| 2005/0021467 A1 | 1/2005 | Franzdonk | |
| 2005/0021629 A1 | 1/2005 | Cannata et al. | |
| 2005/0028006 A1* | 2/2005 | Leser et al. | 713/200 |
| 2005/0039034 A1* | 2/2005 | Doyle et al. | 713/193 |
| 2005/0050098 A1 | 3/2005 | Barnett | |
| 2005/0071275 A1 | 3/2005 | Vainstein et al. | |
| 2005/0071657 A1 | 3/2005 | Ryan | |
| 2005/0071658 A1 | 3/2005 | Nath et al. | |
| 2005/0081029 A1* | 4/2005 | Thornton et al. | 713/156 |
| 2005/0086531 A1 | 4/2005 | Kenrich | |
| 2005/0091289 A1 | 4/2005 | Shappell et al. | |
| 2005/0091484 A1* | 4/2005 | Thornton et al. | 713/156 |
| 2005/0097061 A1 | 5/2005 | Shapiro et al. | |
| 2005/0120199 A1* | 6/2005 | Carter | 713/150 |
| 2005/0138371 A1 | 6/2005 | Supramaniam | |
| 2005/0138383 A1 | 6/2005 | Vainstein | |
| 2005/0168766 A1 | 8/2005 | Troyansky et al. | |
| 2005/0177716 A1 | 8/2005 | Ginter et al. | |
| 2005/0177858 A1 | 8/2005 | Ueda | |
| 2005/0198326 A1* | 9/2005 | Schlimmer et al. | 709/229 |
| 2005/0223242 A1 | 10/2005 | Nath | |
| 2005/0223414 A1 | 10/2005 | Kenrich et al. | |
| 2005/0235154 A1 | 10/2005 | Serret-Avila | |
| 2005/0256909 A1 | 11/2005 | Aboulhosn et al. | |
| 2005/0268033 A1 | 12/2005 | Ogasawara et al. | |
| 2005/0273600 A1* | 12/2005 | Seeman | 713/160 |
| 2005/0283610 A1 | 12/2005 | Serret-Avila et al. | |
| 2005/0288961 A1* | 12/2005 | Tabrizi | 705/1 |
| 2006/0005021 A1 | 1/2006 | Torrubia-Saez | |
| 2006/0075258 A1 | 4/2006 | Adamson et al. | |
| 2006/0075465 A1* | 4/2006 | Ramanathan et al. | 726/1 |

| | | | |
|---|---|---|---|
| 2006/0093150 A1* | 5/2006 | Reddy et al. | 380/282 |
| 2006/0101285 A1 | 5/2006 | Chen et al. | |
| 2006/0149407 A1 | 7/2006 | Markham et al. | |
| 2006/0168147 A1 | 7/2006 | Inoue et al. | |
| 2006/0184637 A1 | 8/2006 | Hultgren et al. | |
| 2006/0230437 A1* | 10/2006 | Alexander Boyer et al. | 726/4 |
| 2006/0277316 A1 | 12/2006 | Wang et al. | |
| 2007/0006214 A1 | 1/2007 | Dubal et al. | |
| 2007/0067837 A1 | 3/2007 | Schuster | |
| 2007/0083575 A1 | 4/2007 | Leung et al. | |
| 2007/0192478 A1 | 8/2007 | Louie et al. | |
| 2007/0193397 A1 | 8/2007 | Hwan et al. | |
| 2007/0294368 A1 | 12/2007 | Bomgaars et al. | |
| 2008/0075126 A1 | 3/2008 | Yang | |
| 2009/0254843 A1 | 10/2009 | Van Wie et al. | |
| 2010/0047757 A1 | 2/2010 | McCurry et al. | |
| 2010/0199088 A1 | 8/2010 | Nath | |

FOREIGN PATENT DOCUMENTS

| | | |
|---|---|---|
| EP | 0 674 253 A1 | 9/1995 |
| EP | 0 809 170 A1 | 11/1997 |
| EP | 0 913 966 A2 | 5/1999 |
| EP | 0 913 967 A2 | 5/1999 |
| EP | 0 950 941 A2 | 10/1999 |
| EP | 0 950 941 A3 | 10/1999 |
| EP | 1 107 504 A2 | 6/2001 |
| EP | 1 107 504 B1 | 6/2001 |
| EP | 1 130 492 A2 | 9/2001 |
| EP | 1 154 348 A2 | 11/2001 |
| EP | 1324565 A1 | 7/2003 |
| GB | 2 328 047 A | 2/1999 |
| JP | 2001-036517 | 2/2001 |
| JP | 2006-244044 A | 9/2006 |
| JP | 2009-020720 A | 1/2009 |
| WO | WO 96/41288 A1 | 12/1996 |
| WO | WO 00/56028 A2 | 9/2000 |
| WO | WO 01/61438 A2 | 8/2001 |
| WO | WO 01/63387 A2 | 8/2001 |
| WO | WO 01/63387 A3 | 8/2001 |
| WO | WO 01/77783 A2 | 10/2001 |
| WO | WO 01/78285 A1 | 10/2001 |
| WO | WO 01/84271 A2 | 11/2001 |

OTHER PUBLICATIONS

Microsoft Windows 200 server. Windows 2000 Group Policy White Paper, 2000.
Symantec. Norton Antivirus Corporate Edition Implementation Guide, 1999.
A Real-Time Push-Pull Communications Model for Distributed Real-Time and Multimedia Systems, Jan. 1999, School of Computer Sciences Carnegie Mellon University, Kanaka Juvva, Raj Rajkumar.
U.S. Appl. No. 10/889,685, entitled "Method and Apparatus for Controlling the Speed Ranges of a Machine" inventor Thomas, Jul. 13, 2004, 18 pgs.
U.S. Appl. No. 10/028,397, entitled "Method and system for restricting use of a clipboard application," inventor Zuili, Dec. 21, 2001, 38 pgs.
U.S. Appl. No. 10/368,277, entitled "Method and apparatus for uniquely identifying files, " inventor Ouye, Feb. 18, 2003, 25 pgs.
U.S. Appl. No. 10/327,320, entitled "Security system with staging capabilities " inventor Vainstein, Dec. 20, 2002, 39 pgs.
U.S. Appl. No. 10/286,524, entitled "Security system that uses indirect password-based encryption, " inventor Gutnik, Nov. 1, 2002, 38 pgs.
U.S. Appl. No. 10/242,185, entitled "Method and system for protecting encrypted files transmitted over a network" inventor Ryan, Sep. 11, 2002, 33 pgs.
U.S. Appl. No. 10/642,041, entitled "Method and system for fault-tolerant transfer of files across a network " inventor Kenrich, Aug. 15, 2003, 32 pgs.
U.S. Appl. No. 10/610,832, entitled "Method and system for enabling users of a group shared across multiple file security systems to access secured files " inventor Ryan, Jun. 30, 2003, 33 pgs.
U.S. Appl. No. 10/448,806, entitled "Method and System for Using Remote Headers to Secure Electronic Files " inventor Ryan, May 30, 2003, 35 pgs.
U.S. Appl. No. 10/074,194, entitled "Methods for identifying compounds that inhibit or reduce PTP1B expressions" inventor Rondinone, Feb. 12, 2002, 69 pgs.
U.S. Appl. No. 10/074,804, entitled "Secured Data Format for Access Control," inventor Garcia, Feb. 12, 2002, 108 pgs.
U.S. Appl. No. 10/075,194, entitled "System and Method for Providing Multi-location Access Management to Secured Items," inventor Vainstein et al., Feb. 12, 2002, 110 pgs.
U.S. Appl. No. 10/074,996, entitled "Method and Apparatus for Securing Electronic Data," inventor Lee et al., Feb. 12, 2002, 111 pgs.
U.S. Appl. No. 10/074,825, entitled "Method and Apparatus for Accessing Secured Electronic Data Off-line," inventor Lee et al., Feb. 12, 2002, 108 pgs.
U.S. Appl. No. 10/105,532, entitled "System and Method for Providing Different Levels of Key Security for Controlling Access to Secured Items," inventor Hildebrand et al., Mar. 20, 2002, 86 pgs.
U.S. Appl. No. 10/186,203, entitled "Method and System for Implementing Changes to Security Policies in a Distributed Security System," inventor Huang, Jun. 26, 2002, 65 pgs.
U.S. Appl. No. 10/201,756, entitled "Managing Secured Files in Designated Locations," inventor Alain, Jul. 22, 2002, 121 pgs.
U.S. Appl. No. 10/206,737, entitled "Method and System for Updating Keys in a Distributed Security System," inventor Hildebrand, Jul. 26, 2002, 60 pgs.
U.S. Appl. No. 10/246,079, entitled "Security System for Generating Keys from Access rules in a Decentralized Manner and Methods Therefore," inventor Hildebrand, Sep. 17, 2002, 78 pgs.
U.S. Appl. No. 10/259,075, entitled "Effectuating Access Policy Changes to Designated Places for Secured Files," inventor Crocker, Sep. 27, 2002, 60 pgs.
U.S. Appl. No. 10/286,575, entitled "Method and Architecture for Providing Access to Secured Data from Non-Secured Clients," inventor Vainstein, Nov. 1, 2002, 46 pgs.
U.S. Appl. No. 10/295,363, entitled "Security System Using Indirect Key Generation from Access Rules and Methods Therefore," inventor Vainstein, Nov. 15, 2002, 70 pgs.
U.S. Appl. No. 11/889,310, entitled "Methods and Systems for Providing Access Control to Electronic Data," inventor Rossmann, Aug. 10, 2007, 90 pgs.
U.S. Appl. No. 11/797,367, entitled "Method and System for Managing Security Tiers," inventor Vainstein, May 2, 2007, 11 pgs.
Adobe Acrobat 5.0 Classroom in a Book, Adobe Press, Jun. 26, 2001, pp. 1-4.
"Security Options". Dec. 20, 2001. DC & Co. pages 1-2.
Microsoft Press Computer Dictionary, 1997, Microsoft Press, Third Edition, p. 426.
Search Report, completion date May 8, 2003, for European Patent Application No. Ep 02 25 8530, 2 pages.
Search Report, completion date Oct. 2, 2003, for European Patent Application No. EP 02 25 8531, 2 pages.
Search Report, completion date Apr. 14, 2005, for European Patent Application No. EP 02 25 8533, 2 pages.
Search Report, completion date Mar. 16, 2005, for European Patent Application No. EP 02 25 8534, 2 pages.
Search Report, completion date Mar. 2, 2005, for European Patent Application No. EP 02 25 8535, 2 pages.
Search Report, completion date Mar. 3, 2005, for European Patent Application No. EP 02 25 8537, 2 pages.
Search Report, completion date May 12, 2005, for European Patent Application No. EP 02 25 8539, 2 pages.
Search Report, completion date Jul. 6, 2005, for European Patent Application No. EP 02 25 8529, 4 pages.
Search Report, completion date Oct. 8, 2003, for European Patent Application No. EP 02 25 8536, 2 pages.
Search Report, completion date May 8, 2003, for European Patent Application No. EP 02 25 8540, 2 pages.
"Encrypting File System," from MSDN Oct. 2001 version, exact publication date is unknown but believed prior to Dec. 12, 2001.
"Features of EFS" from MSDN Oct. 2001 version, exact publication date is unknown but believed prior to Dec. 12, 2001.
"Windows 2000 EFS" in the Apr. 1999 issue of Windows NT magazine.

"How EFS work," from MSDN Oct. 2001 version, exact publication date is unknown but believed prior to Dec. 12, 2001.
"Inside Encryping file system," Part 1, from MSDN Oct. 2001 version, exact publication date is unknown but believed prior to Dec. 12, 2001.
"Inside Encryping file system," Part 2, from MSDN Oct. 2001 version, exact publication date is unknown but believed prior to Dec. 12, 2001.
"Security with Encryping File System," from MSDN Oct. 2001 version, exact publication date is unknown but believed prior to Dec. 12, 2001.
Crocker, Steven Toye, "Effectuating access policy changes to designated places for secured files," U.S. Appl. No. 10/259,075, filed Sep. 27, 2002.
Crocker, Steven Toye, "Multi-level cryptographic transformations for securing digital assets ," U.S. Appl. No. 10/404,566, filed Mar. 31, 2003.
Expiration Mechanism for Chipcards, IBM Technical Disclosure Bulletin, Oct. 1, 2001, UK.
Kenrich, Michael Frederick, "Multi-Level File Digest", U.S. Appl. No. 10/894,493, filed Jul. 19, 2004.
Kinghorn, Gary Mark, "Method and system for protecting electronic data in enterprise environment," U.S. Appl. No. 10/159,220, filed May 31, 2002.
McDaniel et al. "Antigone: A Flexible Framework for Secure Group Communication," Proceedings of the 8th USENIX Security Symposium, Aug. 23, 1999.
Nath, Satyajit, "Method and system for securing digital assets using content type designations," U.S. Appl. No. 10/405,587, filed Apr. 1, 2003.
Prakash, Nalini J., "Method and apparatus for securing/unsecuring files by file crawling," U.S. Appl. No. 10/325,102, filed Dec. 20, 2002.
Rossmann, Alain, "Hybrid systems for securing digital assets," U.S. Application No. 10/325,013, filed Dec. 20, 2002.
Stallings, William, "Cryptography and Network Security: Principles and Practice," 1999, pp. 333-337, Second Edition, Prentice Hall, Upper Saddle River, New Jersey.
Examination Report, completion date Jun. 18, 2008, for European Patent Application No. EP 02 258 532.7-1244, 6 pgs.
Office Action, dated May 10, 2005, for European Patent Application No. 02258532.7, 5 pgs.
Office Action, dated Dec. 5, 2006, for European Patent Application No. 02258532.7, 5 pgs.
Boneh et al., "Hierarchical Identity Based Encryption with Constant Size Ciphertext," Advances in Cryptology—EUROCRYPT 2005, vol. 3493, Jun. 20, 2005, pp. 440-456.
Boneh et al., "IBE Secure E-mail," Stanford University, Apr. 8, 2002, http://crypto.stanford.edu/ibe/.
Curtis et al., "Securing the Global, Remote, Mobile User," 1999 John Wiley & Sons, Ltd., Int. J. Network Mgmt. 9, pp. 9-21.
"Secure Sockets Layer (SSL): How it Works," Verisign, http://www.verisign.com/ssl/ssl-information-center/how-ssi-security-works, pp. 1-2.
"Column Archives," Microsoft TechNet, Professor Windows, technet.microsoft.com/enus/library/bb878075.aspx, retrieved on Dec. 3, 2009.
"Columns," Microsoft TechNet http://web.archive.org/web/20021014225142/www.microsoft.com/techneUcolumns/default.asp Oct. 14, 2002, Retrieved from web.archive.org on Dec. 3, 2009.
"eXPeriencing Remote Assistance" Microsoft TechNet—Professor Windows Oct. 2002 Oct. 15, 2002 http://web.archive.org/web/20021015165237/www.microsoft.com/techneUcolumns/profwin/, Retrieved from web.archive.org on Dec. 3, 2009.
"Migrating Accounts From Windows NT 4.0 Domains to Windows 2000," Microsoft TechNet—Professor Windows Apr. 2002, http://web.archive.org/web/20020415004611/www. microsoft.com/techneticolu mns/profwin/, Apr. 15, 2002.
"Scripting Your Windows 2000 Network, Part 1" Microsoft TechNet—Professor Windows Jun. 2002, http://web.archive.org/web/20020622055532/www.microsoft.com/techneUcolumns/profwin/ Retrieved from web.archive.org on Dec. 3, 2009.
"WayBack Machine" web.archive.org, http://web.archive.org/web/*/http://www.microsoft.com/technetlcolumns/profwin/, Retrieved on Dec. 3, 2009.
English language translation (unverified, machine-generated) of Japanese Patent Publication No. JP 2006-244044, Japanese Patent Office, Patent & Utility Model Gazette DB, 2006.
English language translation (unverified, machine-generated) of Japanese Patent Publication No. 2009-020720, Japanese Patent Office, Patent & Utility Model Gazette DB, 2009.
English language abstract for Japanese Appl. No. 2001-036517, filed Feb. 9, 2001, 1 pg.
Botha et al., "Access Control in Document-Centric Workflow Systems—An Agent-Based Approach," Computers & Security, vol. 20:6, Sep. 2001, pp. 525-532.
Botha et al., "Separation of Duties for Access Control Enforcement in Workflow Environments," IBM, 2001.
Adobe Acrobat Security Settings, Acrobat 7.0, Nov. 15, 2004; pp. 1-4.
U.S. Appl. No. 60/475,109, Leser, et al., "Method for Enforcing and Managing Usage Rights of Digital Data Objects in Dynamic, Distributed and Collaborative Contexts", filed Jun. 2, 2003.

* cited by examiner

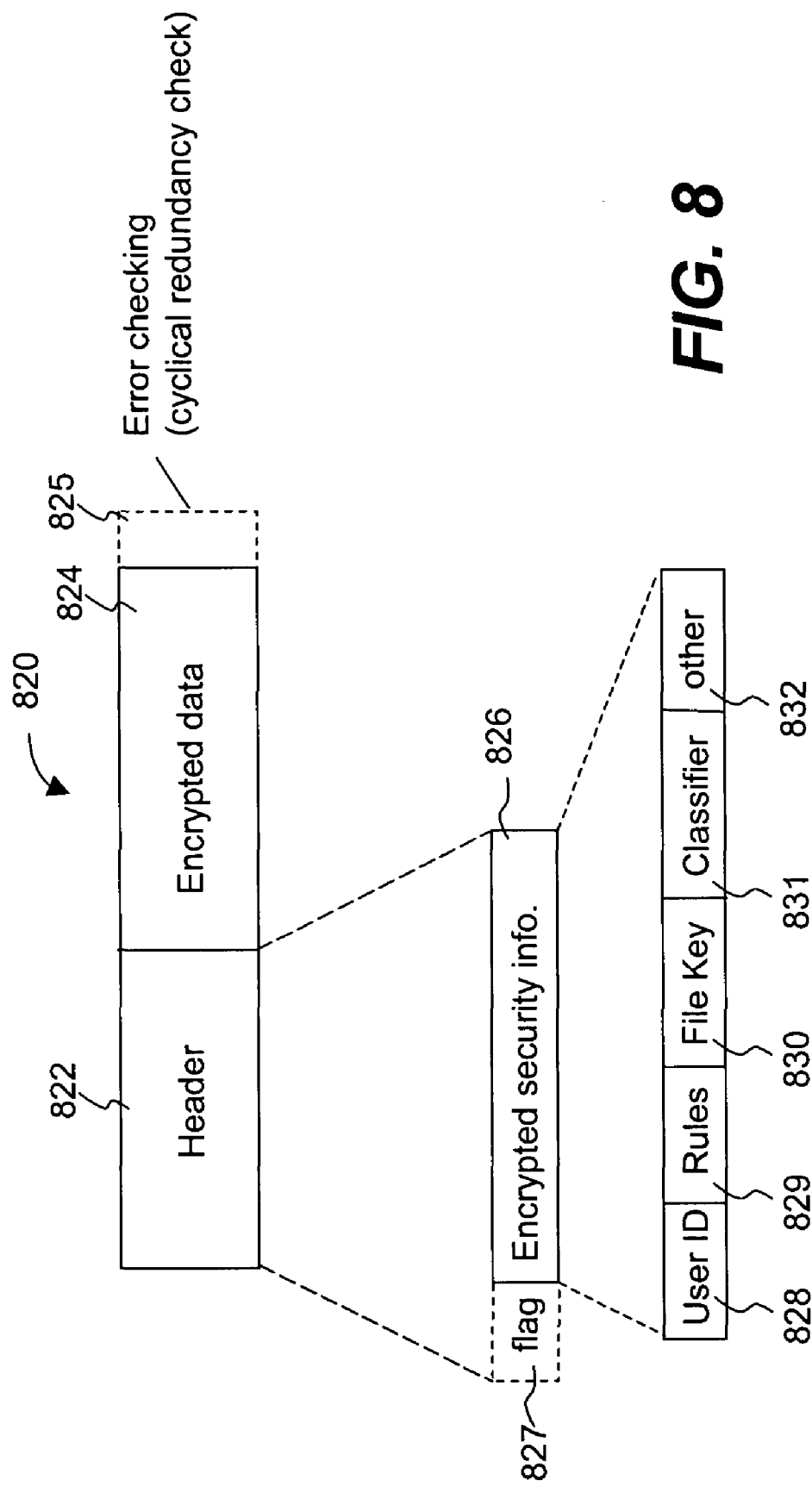

METHOD AND APPARATUS FOR TRANSITIONING BETWEEN STATES OF SECURITY POLICIES USED TO SECURE ELECTRONIC DOCUMENTS

CROSS-REFERENCE TO RELATED APPLICATIONS

This application is related to: (i) U.S. patent application Ser. No. 10/677,049, filed concurrently herewith, and entitled "METHOD AND SYSTEM FOR SECURING DIGITAL ASSETS USING PROCESS-DRIVEN SECURITY POLICIES," which is hereby incorporated herein by reference; (ii) U.S. patent application Ser. No. 10/405,587, filed Apr. 1, 2003, and entitled "METHOD AND APPARATUS FOR SECURING DIGITAL ASSETS USING CONTENT TYPE DESIGNATIONS," which is hereby incorporated herein by reference; (iii) U.S. patent application Ser. No. 10/159,537, filed May 5, 2002, and entitled "METHOD AND APPARATUS FOR SECURING DIGITAL ASSETS," which is hereby incorporated herein by reference; and (iv) U.S. patent application Ser. No. 10/127,109, filed Apr. 22, 2002, and entitled "EVALUATION OF ACCESS RIGHTS TO SECURED DIGITAL ASSETS," which is hereby incorporated herein by reference.

BACKGROUND OF THE INVENTION

1. Field of the Invention

The present invention relates to security systems for data and, more particularly, to security systems that protect data in an inter/intra enterprise environment.

2. Description of Related Art

The Internet is the fastest growing telecommunications medium in history. This growth and the easy access it affords have significantly enhanced the opportunity to use advanced information technology for both the public and private sectors. It provides unprecedented opportunities for interaction and data sharing among businesses and individuals. However, the advantages provided by the Internet come with a significantly greater element of risk to the confidentiality and integrity of information. The Internet is an open, public and international network of interconnected computers and electronic devices. Without proper security means, an unauthorized person or machine may intercept information traveling across the Internet and even gain access to proprietary information stored in computers that interconnect to the Internet.

There are many efforts in progress aimed at protecting proprietary information traveling across the Internet and controlling access to computers carrying the proprietary information. Cryptography allows people to carry over the confidence found in the physical world to the electronic world, thus allowing people to do business electronically without worries of deceit and deception. Every day millions of people interact electronically, whether it is through e-mail, e-commerce (business conducted over the Internet), ATM machines, or cellular phones. The perpetual increase of information transmitted electronically has led to an increased reliance on cryptography.

One of the ongoing efforts in protecting the proprietary information traveling across the Internet is to use one or more cryptographic techniques to secure a private communication session between two communicating computers on the Internet. The cryptographic techniques provide a way to transmit information across an unsecure communication channel without disclosing the contents of the information to anyone eavesdropping on the communication channel. Using an encryption process in a cryptographic technique, one party can protect the contents of the data in transit from access by an unauthorized third party, yet the intended party can read the encrypted data after using a corresponding decryption process.

A firewall is another security measure that protects the resources of a private network from users of other networks. However, it has been reported that many unauthorized accesses to proprietary information occur from the inside, as opposed to from the outside. An example of someone gaining unauthorized access from the inside is when restricted or proprietary information is accessed by someone within an organization who is not supposed to do so. Due to the open nature of networks, contractual information, customer data, executive communications, product specifications, and a host of other confidential and proprietary intellectual property remain available and vulnerable to improper access and usage by unauthorized users within or outside a supposedly protected perimeter.

Many businesses and organizations have been looking for effective ways to protect their proprietary information. Typically, businesses and organizations have deployed firewalls, Virtual Private Networks (VPNs), and Intrusion Detection Systems (IDS) to provide protection. Unfortunately, these various security means have been proven insufficient to reliably protect proprietary information residing on private networks. For example, depending on passwords to access sensitive documents from within often causes security breaches when the password of a few characters long is leaked or detected. Consequently, various cryptographic means are deployed to provide restricted access to electronic data in security systems.

Various security criteria, such as encryption or decryption keys, are often used to facilitate restricted access to data in security systems. Conventional uses of security criteria provide static assignment of security criteria to electronic resources being secured. However, the assigning of security criteria in a static manner does not permit subsequent alteration of the security criteria under certain conditions. Although an administrator may be able to change the security criteria for an electronic resource that has already been secured, such alteration would be a manual process only available to the administrator. Further, given that an administrator is managing secure electronic resources (e.g., data) for many users, it is not feasible for the administrator to participate in the changing of security criteria for a large volume of electronic resources. Therefore, there is a need to provide more effective ways for security systems to permit security criteria imposed on electronic resources to be changed, thereby altering the security used to protect the electronic resources.

SUMMARY OF THE INVENTION

The invention relates to techniques for dynamically altering security criteria used in a system (e.g., a file security system for an enterprise). The security criteria pertains to keys (or ciphers) used by the file security system to encrypt electronic files to be secured, or to decrypt electronic files already secured. The security criteria can, among other things, include keys that are required to gain access to electronic files. Here, the keys can be changed automatically as electronic files transition between different states of a process-driven security policy. The dynamic alteration of security criteria enhances the flexibility and robustness of the security system. In other words, access restrictions on electronic files can be dependent on the state of the process-driven security policy and enforced in conjunction with one or more cryptographic methods.

According to one aspect of the invention, methods and systems for securing electronic files use process-driven security policies. As an electronic file transitions through a process, access restrictions can automatically change. The process can be defined by a number of states, with each state having different security policies associated therewith. The security policies control, for example, which users are permitted to access the electronic files, or how the electronic files can be accessed. In one embodiment, the access restrictions are imposed by one or more keys that are required to decrypt electronic files that were previously secured. The process can also be referred to as a workflow, where the workflow has a series of states through which files (documents) can move, where different security policies can be imposed at different states.

Another aspect of the invention is that process-driven security policies are enforced or controlled at a server of a file security system. A group of one or more electronic documents are bound together and progress together through states of a process specified by process-driven security policies. The server can automatically and remotely enforce the process-driven security policies on the group of electronic documents.

Still another aspect of the invention is that process-driven security policies are controlled at a client of a file security system. Here, each individual electronic document can be separately and independently bound to process-driven security policies. The process-driven security policies can thus operate at the client with little or no communication with a central server in most cases.

The process-driven security policies typically offer persistent states. Each state can specify a different set of users or groups of users that are permitted access to an electronic document. The states are also independent of the electronic documents themselves.

The invention can be implemented in numerous ways, including as a method, system, device, and computer readable medium. Several embodiments of the invention are discussed below.

As a document security system for restricting access to documents, one embodiment of the invention includes at least: a process-driven security policy that includes a plurality of states and transition rules, each of the states corresponding to one or more access restrictions, and the transition rules specify when the secured document is to transition from one state to another; and an access manager that determines whether access to a secured document is permitted by a requestor based on the state and the corresponding one or more access restrictions thereof for the process-driven security policy.

As a method for transitioning at least one secured document through a security-policy state machine having a plurality of states, one embodiment of the invention includes at least the acts of: receiving an event; determining whether the event causes a state transition for the at least one secured document from a former state to a subsequent state of the security-policy state machine; and automatically transitioning from the former state to the subsequent state of the security-policy state machine when the determining determines that the event causes the state transition.

As a method for imposing access restrictions on electronic documents, one embodiment of the invention includes at least the acts of: providing at least one process-driven security policy at a server machine, the process-driven security policy having a plurality of states associated therewith, each of the states having distinct access restrictions; providing a reference to the process-driven security policy at a client machine, the reference referring to the process-driven security policy resident on the server machine; associating the reference to an electronic document; transitioning the process-driven security policy from one state to a current state; and subsequently determining at the server computer whether a requestor is permitted to access the electronic document, the access being based on a current state of the process-driven security policy, the current state being informed to the server computer by sending the reference to the server computer.

As a computer readable medium including at least computer program code for transitioning at least one secured document through a security-policy state machine having a plurality of states, one embodiment of the invention includes at least: computer program code for receiving an event; computer program code for determining whether the event causes a state transition for the at least one secured document from a former state to a subsequent state of the security-policy state machine; and computer program code for automatically transitioning from the former state to the subsequent state of the security-policy state machine when the computer program code for determining determines that the event causes the state transition.

As a computer readable medium including at least computer program code for imposing access restrictions on electronic documents, one embodiment of the invention includes at least: computer program code for providing at least one process-driven security policy at a server machine, the process-driven security policy having a plurality of states associated therewith, each of the states having distinct access restrictions; computer program code for providing a reference to the process-driven security policy at a client machine, the reference referring to the process-driven security policy resident on the server machine; computer program code for associating the reference to an electronic document; computer program code for transforming the process-driven security policy from one state to a current state; and computer program code for determining at the server computer whether a requester is permitted to access the electronic document, the access being based on a current state of the process-driven security policy, the current state being informed to the server computer by sending the reference to the server computer.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the invention will become better understood with regard to the following description, appended claims and accompanying drawings, wherein:

FIG. 8 shows an exemplary data structure of a secured file that may be used in one embodiment of the invention.

DETAILED DESCRIPTION OF THE INVENTION

Figure 1:
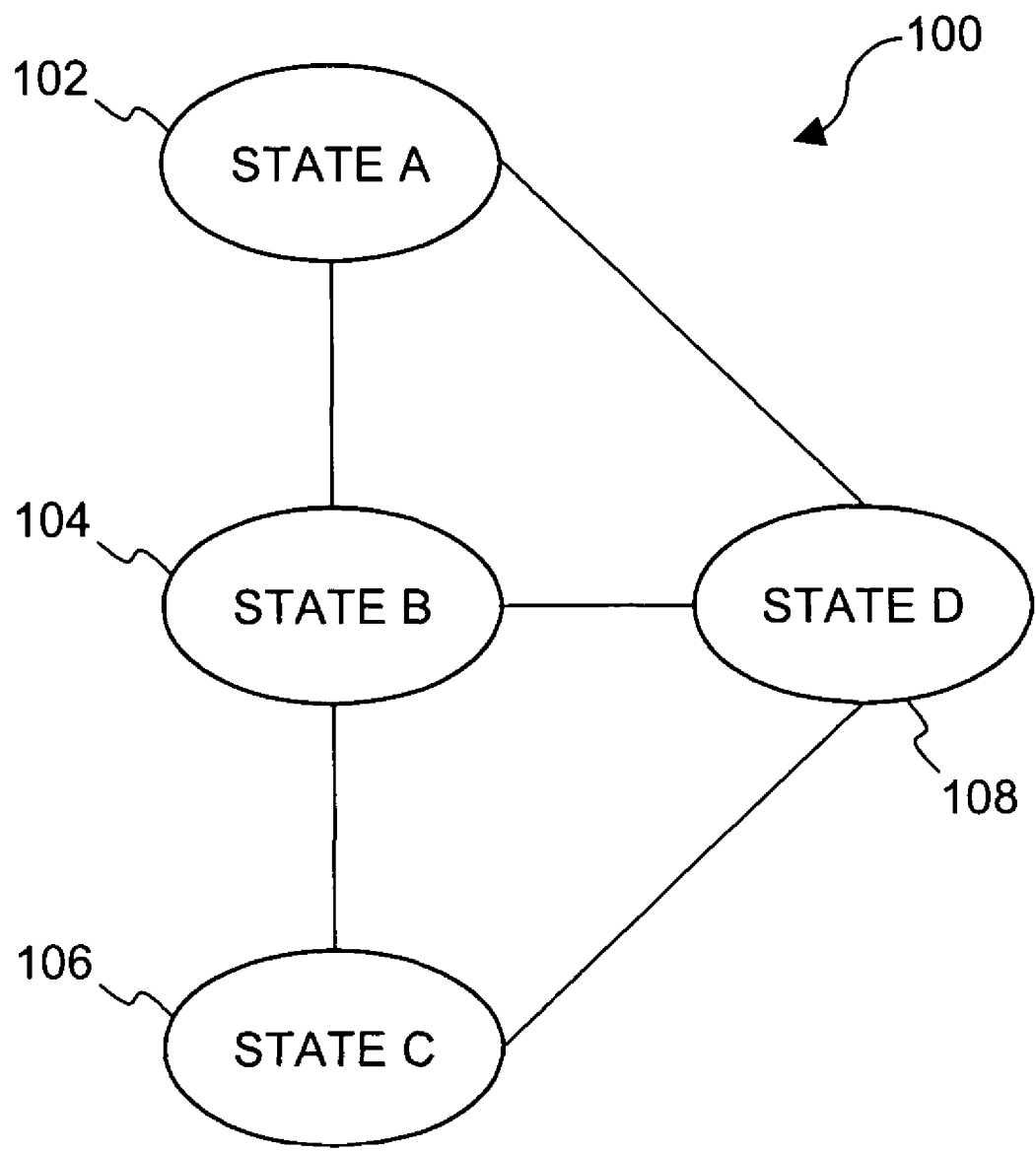
FIG. 1 is a diagram of an exemplary process-driven security policy (PDSP) according to one embodiment of the invention.

The invention relates to techniques for dynamically altering security criteria used in a system (e.g., a file security system for an enterprise). The security criteria pertains to keys (or ciphers) used by the file security system to encrypt electronic files to be secured, or to decrypt electronic files already secured. The security criteria can, among other things, include keys that are required to gain access to electronic files. Here, the keys can be changed automatically as electronic files transition between different states of a process-driven security policy. The dynamic alteration of security criteria enhances the flexibility and robustness of the security system. In other words, access restrictions on electronic files can be dependent on the state of the process-driven security policy.

As used herein, a file may include, but not be limited to, one or more various types of documents, multimedia files, data, executable code, images and texts, and in some cases, a collection of files. Accordingly, a secured file means that an electronic file typically stored or presented in a form that is nearly impossible to read without authorization and authentication. Its purpose is to ensure privacy by keeping the content in a file hidden from anyone for whom it is not intended, even those who may have a copy of the file.

According to one aspect of the invention, methods and systems for securing electronic files use process-driven security policies. As an electronic file transitions through a process, access restrictions can automatically change or remain intact depending on the process. The process can be defined by a number of states, with each state having its corresponding security policies associated therewith. The security policies control, for example, which users are permitted to access the electronic files or how the electronic files can be accessed. In one embodiment, the access restrictions are imposed by one or more keys that are required to decrypt electronic files that were previously secured. The process can also be referred to as a workflow, where the workflow has a series of states through which files (documents) can move, where different security policies can be imposed at different states.

Another aspect of the invention is that process-driven security policies are controlled at a server of a file security system. A group of one or more electronic documents are bound together and progress together through states of a process specified by process-driven security policies. The server can automatically and remotely enforce the process-driven security policies on the group of electronic documents.

Still another aspect of the invention is that process-driven security policies are controlled at a client of a file security system. Here, each individual electronic document can be separately and independently bound to process-driven security policies. The process-driven security policies can thus operate at the client with little or no communication with a central server.

The process-driven security policies typically offer persistent states. Each state can specify a different set of users that are permitted access to an electronic document. The states are also independent of the electronic documents themselves.

Secured files are files that require one or more keys, passwords, access privileges, etc. to gain access to their content. The security is often provided through encryption and access rules. The files, for example, can pertain to documents, multimedia files, data, executable code, images and text. In general, a secured file can only be accessed by authenticated users with appropriate access rights or privileges. In one embodiment, each secured file is provided with a header portion and a data portion, where the header portion contains, or points to, security information. The security information is used to determine whether access to associated data portions of secured files is permitted.

In one embodiment, security information provided with an electronic document controls restrictive access to a data portion which is encrypted. The security information can employ access rules together with cipher keys (e.g., a file key and various other keys) to ensure that only those users with proper access privileges or rights can access the encrypted data portion.

As used herein, a user may mean a human user, a software agent, a group of users, a member of the group, a device and/or application. Besides a human user who needs to access a secured document, a software application or agent sometimes needs to access secured files in order to proceed. Accordingly, unless specifically stated, the "user" as used herein does not necessarily pertain to a human being.

The invention is related to processes, systems, architectures and software products for providing pervasive security to digital assets (e.g., electronic documents). The invention is particularly suitable in an enterprise environment. In general, pervasive security means that digital assets are secured (i.e., secured data) and can only be accessed by authenticated users with appropriate access rights or privileges. Digital assets may include, but not be limited to, various types of documents, multimedia files, data, executable code, images and texts.

In the following description, numerous specific details are set forth in order to provide a thorough understanding of the invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order, nor imply any limitations in the invention.

Embodiments of the invention are discussed herein with reference to FIGS. 1-8. However, those skilled in the art will readily appreciate that the detailed description given herein with respect to these figures is for explanatory purposes as the invention extends beyond these limited embodiments.

FIG. 1 is a diagram of an exemplary process-driven security policy (PDSP) 100 according to one embodiment of the invention. The process-driven security policy 100 includes a plurality of different states. As shown in FIG. 1, the process-driven security policy 100 can include state A 102, state B 104, state C 106, and state D 108. Each of these different states can be associated with one or more access restrictions.

The process-driven security policy 100 is used by a file (document) security system to restrict access to files (documents). As files are placed in different ones of the states of the process-driven security policy 100, the access restrictions being utilized to secure access to the files typically changes. More particularly, as the files move from state-to-state in accordance with a process, the access restrictions utilized by the files often changes. Indeed, the access restrictions can change automatically based upon the state the file is in, and thus does not necessarily require user or administrator interaction in order to change the access restrictions. Typically, access restrictions will designate which users (or groups of users) are able to access secure documents, whether certain clearance levels are needed, whether off-line access is permitted, and which of various other possible criteria or considerations are utilized. A set of access restrictions for the various states can be referred to as a security policy.

A file can transition between the various states of the process-driven security policy 100 in a controlled manner. Often, the process-driven security policy 100 defines the transitions that are permissible. In one embodiment, the state transitions are event-driven. The events can be either internal to the file security system or external to the file security system. When event-driven, the transitions between states can be automatic and thus do not require user or administrator interaction. However, some events can be triggered or initiated by user or administrator interaction.

As shown in FIG. 1, a file (document) can transition between the different states 102-108 offered by the process-driven security policy 100. For example, a file currently in state A 102 can transition to state B 104 or state D 108, depending upon process-related conditions (e.g., events). Similarly, a file in state D 108, depending upon process considerations, can transition to state A 102, state B 104 or state C 106. Likewise, a file in state B 104 or state C 106 can transition to one or more other states. Additional details on states, security policies and transitions between states are discussed in additional detail below.

Figure 2:
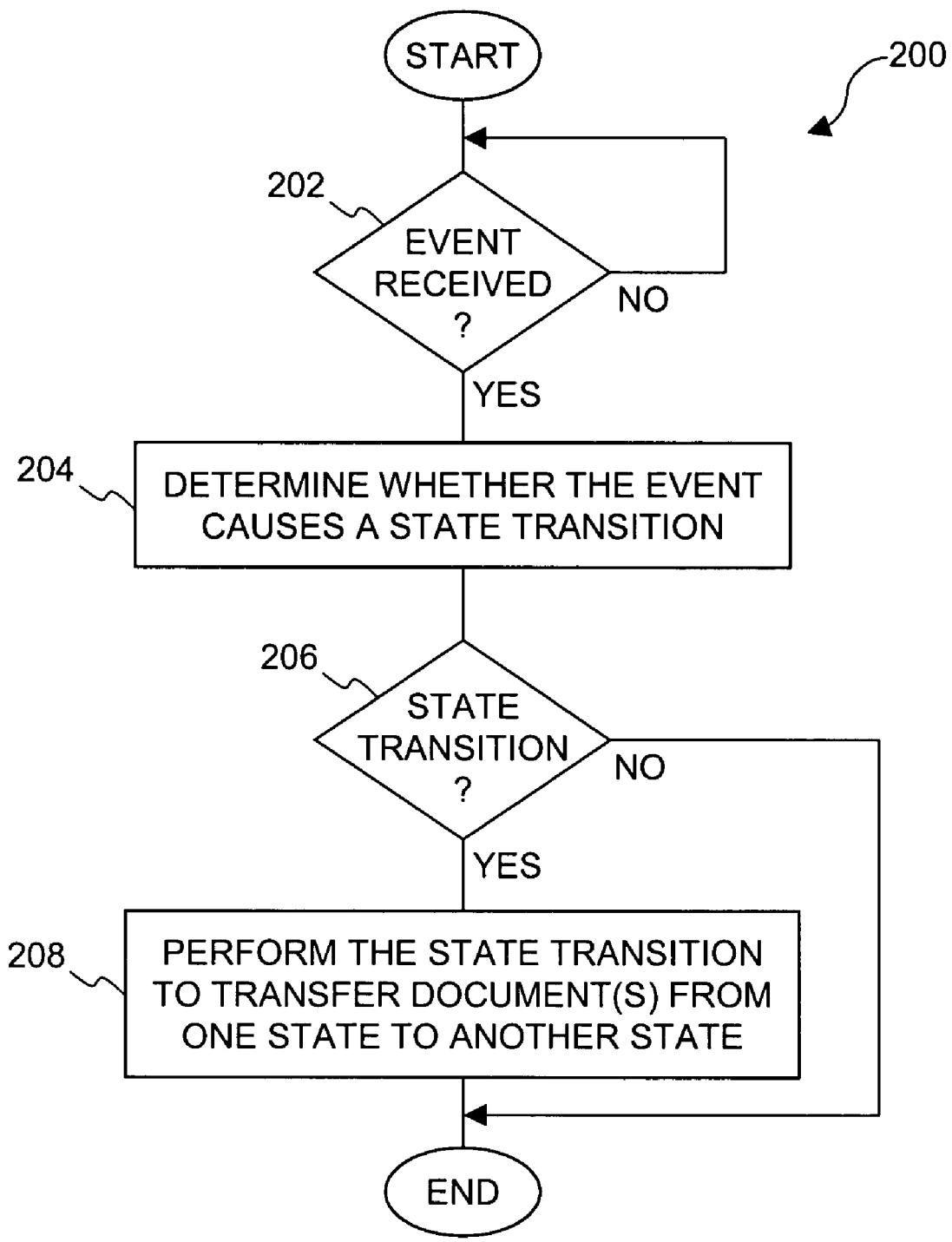
FIG. 2 is a flow diagram of a transition process according to one embodiment of the invention.

FIG. 2 is a flow diagram of a transition process 200 according to one embodiment of the invention. The transition process 200 can be used to transition a document (file) between different states of a process-driven security policy, such as the process-driven security policy shown in FIG. 1. The transition process 200 is typically deemed process-driven because it is driven by a process. The process is, for example, defined by transition rules. The transition rules typically rely upon events to cause transitions between states. Often user or administrator interaction is not involved when activating transitions. However, the transition process 200 can permit a user or administrator to participate in activating transitions, such as by causing an event to occur which initiates a transition.

The transition process 200 begins with a decision 202 that determines whether an event relevant to the process-driven security policy imposed on a document has been received. Typically, the process-driven security policy is imposed on the document by a file security system. One implementation of a process-driven security policy is a security policy state machine. The process-driven security policy (or security policy state machine) has a plurality of states, and transition rules for transitioning between the various states. In any case, the transition process 200 monitors events that are relevant to the process-driven security policy (or the security policy state machine). When the decision 202 determines that an event has not yet been received, the transition process 200 awaits such an event.

On the other hand, when the decision 202 determines that an event has been received, then the transition process 200 determines 204 whether the event causes a state transition. Here, the rules by which transitions between states occur, i.e., transition rules, can be specified by the process-driven security policy. For example, an administrator for the document security system may have created the process-driven security policy and thus defined its states and its transition rules. Hence, when an event is received, it is evaluated to determine 204 whether the event causes a state transition. When the decision 206 determines that a state transition is to occur, the state transition is performed 208 to transfer one or more documents from one state to another state. Alternatively, when the decision 206 determines that a state transition is not to occur, the block 208 is bypassed so that no state transition is performed. Once the one or more documents transition to the new state, the access restrictions for the new state govern when access to the documents, which are secured, is permitted. Following the block 208 or its being bypassed, the transition process 200 is complete and ends.

Figure 3:
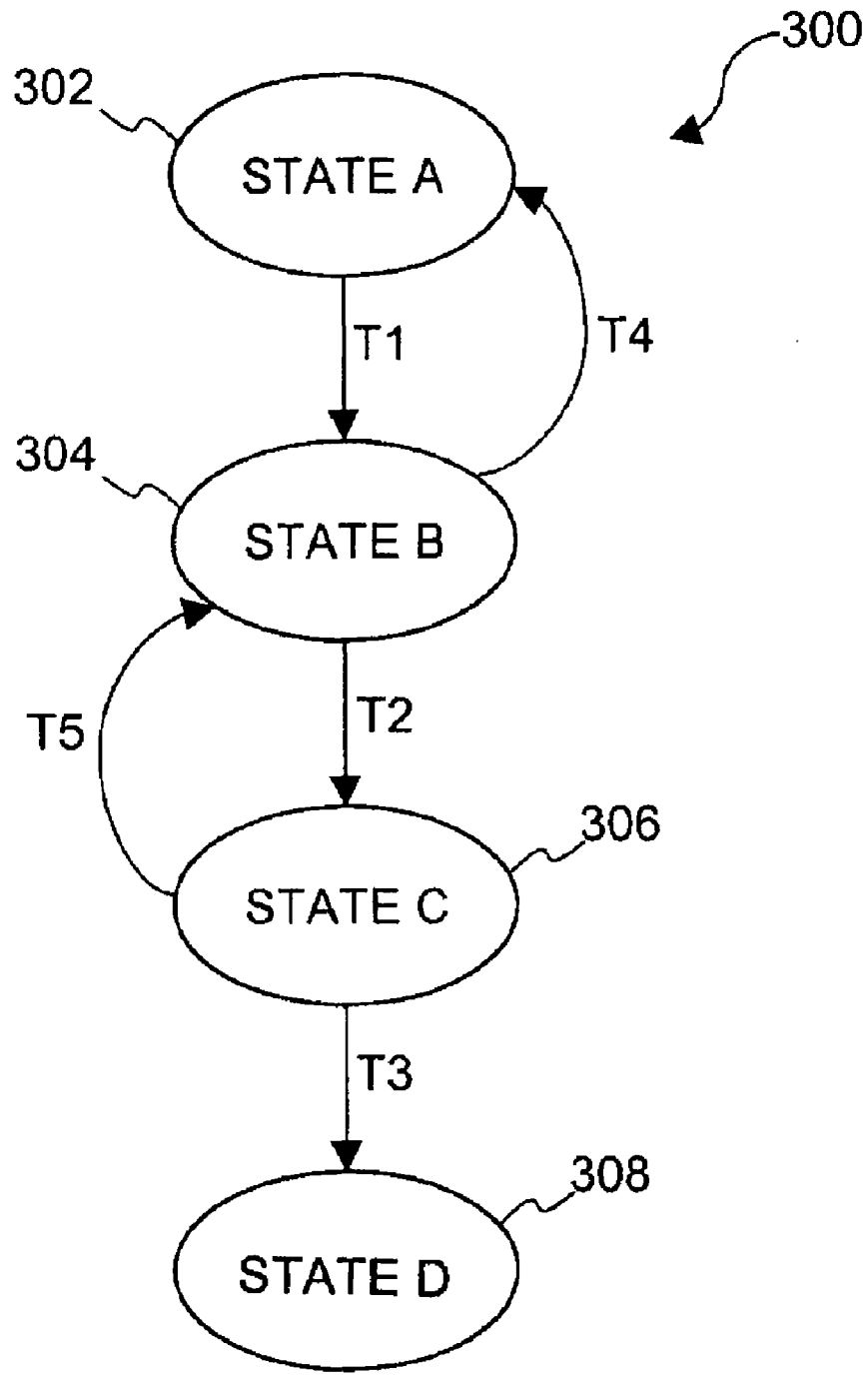
FIG. 3 illustrates a security policy state machine according to one embodiment of the invention.

FIG. 3 illustrates a security policy state machine 300 according to one embodiment of the invention. As previously noted, a security policy state machine is one implementation of a process-driven security policy. In this exemplary embodiment, the security policy state machine 300 includes four distinct states, namely, a state A ("Draft") 302, state B ("Final Draft") 304, state C ("Retain") 306, and state D ("Delete") 308. Each of these states has one or more associated access restriction for documents (files) which reside in that state. Further, the permitted transitions between the various states 302-308 are identified by transitions T1-T5. In particular, a document in the Draft state 302 can follow the transition T1 to the Final Draft state 304. A document in the Final Draft state 304 can follow the transition T2 to the Retain state 306. A document in the Retain state 306 can follow transition T3 to the Delete state 308. Further, a document in the Final Draft state 304 can follow transition T4 to the Draft state 302, and a document in the Retain state 306 can follow transition T5 to the Final Draft state 304.

A file security system can enforce the security policy state machine 300 on one or more electronic documents. In doing so, the security policy state machine 300 is typically described in a textual manner, such as in a markup language (e.g., XML), pseudo-code, and the like. One representative example of a textual description of the security policy state machine 300 is as follows.

State=DRAFT
    Accessors=Finance, unrestricted
    Deny off-line access
    Grant audit access
    State=FINAL DRAFT
    Accessors=Finance, restricted; Finance Managers, unrestricted
    Deny off-line access
    Grant audit access
    State=RETAIN
    Accessors=All Allow off-line access
Deny audit access
State=DELETE
Accessors=None Note that in the Draft state, the users with permission to access the electronic document (referred to as "Accessors") include those users that are members of a Finance group. The access is also unrestricted in this Draft state. Also, in the Draft state, offline access to the electronic document is not permitted, but audit access is permitted. Note, however, in the Final Draft state, those users that are members of the Finance group now only have restricted access. In one embodiment, restricted access means that the data (content) of the document can be accessed but that such data cannot be further disseminated through operations such as cut, paste, print, etc.

Additionally, the security policy state machine 300 transitions between the various states in accordance with transition rules. Typically, the transition rules are triggered by the occurrence of events. The events can be internal or external. The external events can originate from users or from another system (e.g., a document management system). In a specific case of the security policy state machine 300, a representative description of a transition rule is as follows.

On event ( ), transition from STATE1 to STATE2

Some exemplary transition rules using internal or external events are as follows.

On (time=Sep. 1, 2008), RETAIN to DELETE
On (ExtEvent=docCheckIn), FINAL DRAFT to RETAIN
On (ExtEvent=docFinalize), DRAFT to FINAL DRAFT
On (ExtEvent=docReject), FINAL DRAFT to DRAFT
On (period=event transition day (FINAL DRAFT)+90 days), FINAL DRAFT to RETAIN Of these exemplary transition rules, the first and last transition rules are triggered by internal events and the others are triggered by external events. For example, the external events can be from a document management system that is separate from the file (document) security system.

Figure 4A:
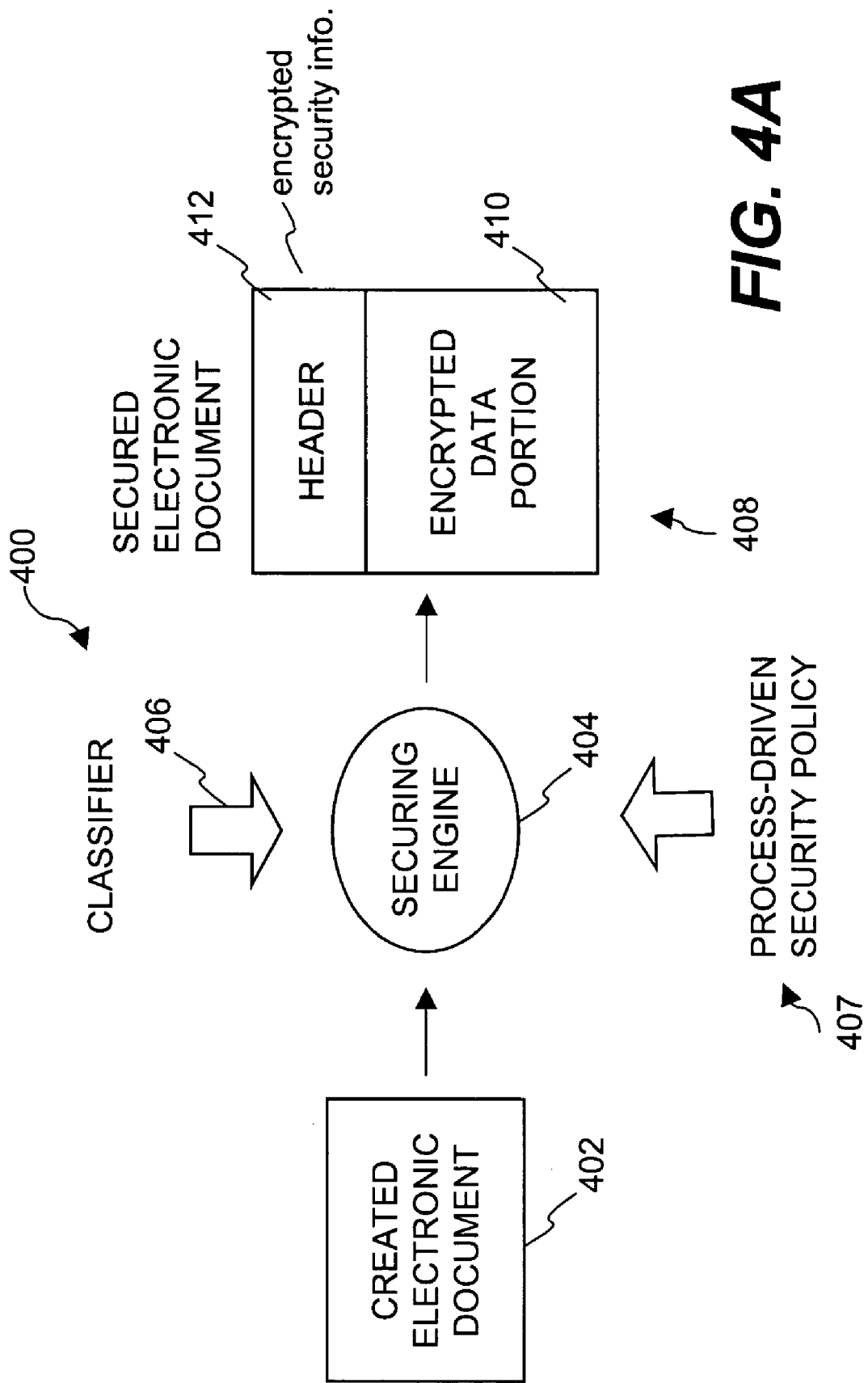
FIG. 4A is a diagram of a document securing system according to one embodiment of the invention.

FIG. 4A is a diagram of a document securing system 400 according to one embodiment of the invention. The document securing system 400 is, for example, performed by a computing device, such as client computer 701 or 702 shown in FIG. 7 below.

The document securing system 400 creates or obtains an electronic document 402 that is to be secured. The electronic document 402 is then supplied to a securing engine 404. The securing engine 404 receives a designation of a classifier 406 to be associated with the electronic document 402. The classifier 406 refers to an accessor user list, and possibly other forms of access restriction. In one embodiment, the classifier 406 can be a label to a categorization of the electronic document with respect to a plurality of different types of content. Examples of classifiers include: External, Financial, Sales Forecast, Sales Quota, Press Release, Budget, Marketing Presentation, Marketing Planning, Engineering Planning, Engineering Project X, Engineering Specification, and Engineering Design. In addition, the securing engine 404 can receive a process-driven security policy 407 to be used to secure the electronic document 402. In one embodiment, the process-driven security policy 407 is chosen from a plurality of process-driven security policies based on the classifier 406. In another embodiment, the process-driven security policy 407 is made up of states, and each of the states correspond to one of the classifiers 406.

The securing engine 404 operates to produce a secured electronic document 408. The secured electronic document 408 includes an encrypted data portion 410 and a header portion 412. The encrypted data portion 410 is the electronic document 402 after having been encrypted. The encryption can result from the use of one or more keys and encryption algorithms. For stronger security, a hierarchy of encryption may be used. The header portion 412 is also referred to as encrypted security information, because the header portion 412 includes the encrypted security information as at least a substantial component of the header portion 412. The encrypted security information can include a classifier, access rules and at least one key (e.g., file key, private state key). The access rules and the keys utilized to encrypt the electronic document 402 depend on the state of the associated process-driven security policy 407 which is indicated by the classifier. Initially, the electronic document 402 is encrypted in accordance with an initial state of the process-driven security policy 407. Typically, one of the states of the process-driven security policy 407 is designated as its initial state.

Hence, if the encrypted security information is able to be decrypted, the file key is able to be retrieved from the header portion 412 and used to decrypt the encrypted data portion 410 of the secured electronic document 408, as will be discussed in more detail below with respect to FIG. 5C. However, the encrypted security information in the header portion 412 is often secured through one or multiple layers of encryption, which can use various keys. These various keys are used to encrypt the security information. Typically, these various keys are managed by a server, but made available to client computers so that decryption can be performed locally. In one implementation, the encrypted security information within the header portion 412 can be decrypted if, and only if, the decrypting party has possession of both of the following: a group key (a private key for a group specified in the header), and a state key (a private key for the classifier specified in the header). As previously noted, the classifier is used to determine the state of the process-driven security policy 407.

Additional details on securing files or documents is provided in U.S. patent application Ser. No. 10/159,537, filed May 5, 2002, and entitled "METHOD AND APPARATUS FOR SECURING DIGITAL ASSETS," which is hereby incorporated by reference.

Figure 4B:
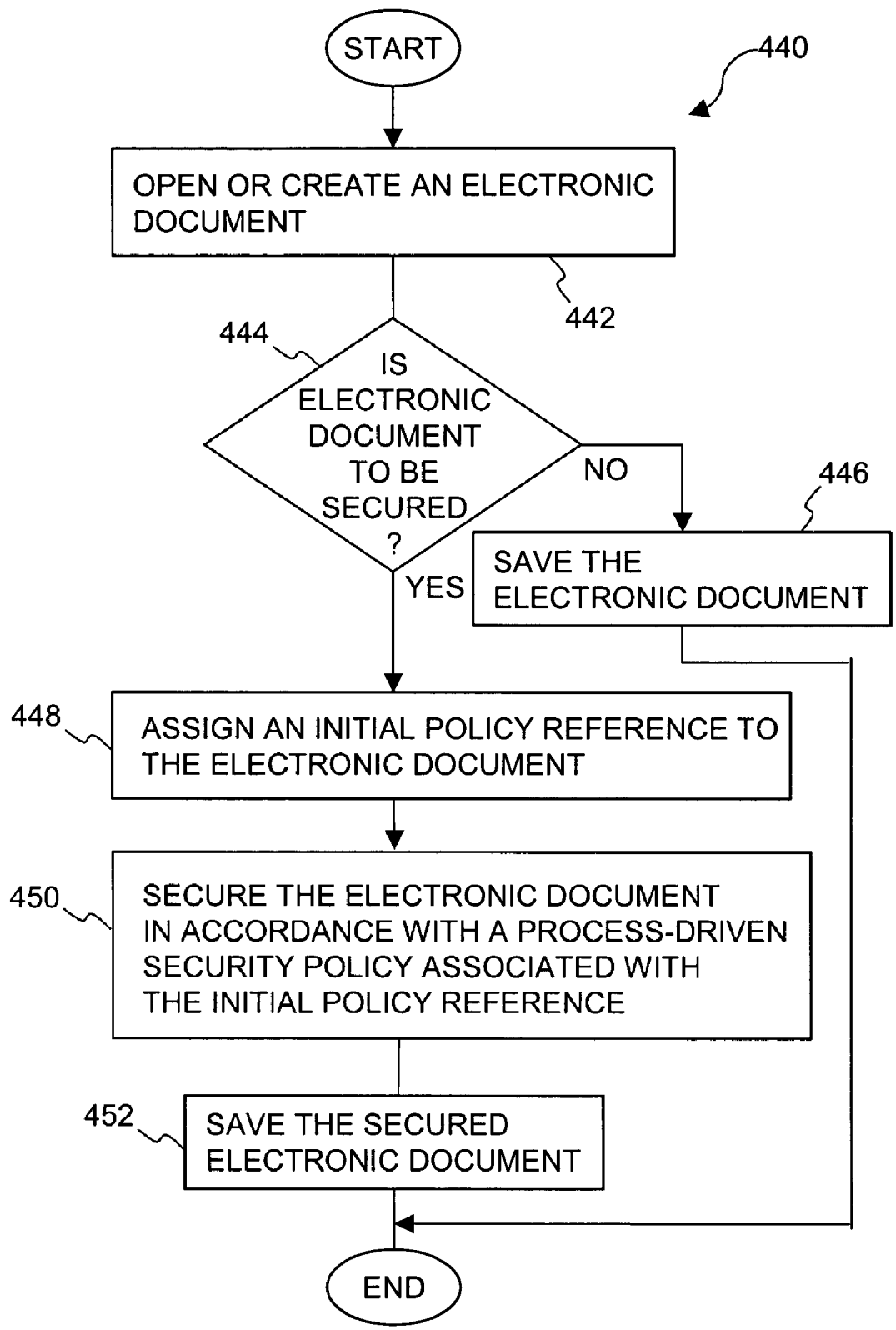
FIG. 4B is a flow diagram of a document securing process according to one embodiment of the invention.

FIG. 4B is a flow diagram of a document securing process 440 according to one embodiment of the invention. The document securing process 440 represents processing performed by a document securing system, such as the document securing system 400 illustrated in FIG. 4A.

The document securing process 440 initially opens or creates 442 an electronic document. Next, a decision 444 determines whether the electronic document is to be secured. When the decision 444 determines that the electronic document is not to be secured, then the electronic document is saved 446 in the normal course. Here, the electronic document is not secured but simply stored in a conventional fashion.

On the other hand, when the decision 444 determines that the electronic document is to be secured, then an initial policy reference for the electronic document is assigned 448. In one implementation, the policy reference is a pointer to an accessor user list. A classifier for an electronic document can be assigned in a variety of different ways. In one implementation, a user or creator of the electronic document is able to assign the classifier. For example, the user or creator of the electronic document might interact with a graphical user interface to select a classifier from a list of available classifiers.

After the policy reference is assigned 448, the electronic document is secured 450 in accordance with a process-driven security policy associated with the policy reference. Here, the electronic document is typically secured in accordance with the initial state of the process-driven security policy. Thereafter, the secured electronic document is saved 452. Following the operations 452 and 446, the document securing process 440 is complete and ends. The subsequent transitions to other states of the process-driven security policy is discussed below with reference to FIG. 6.

Figure 4C:
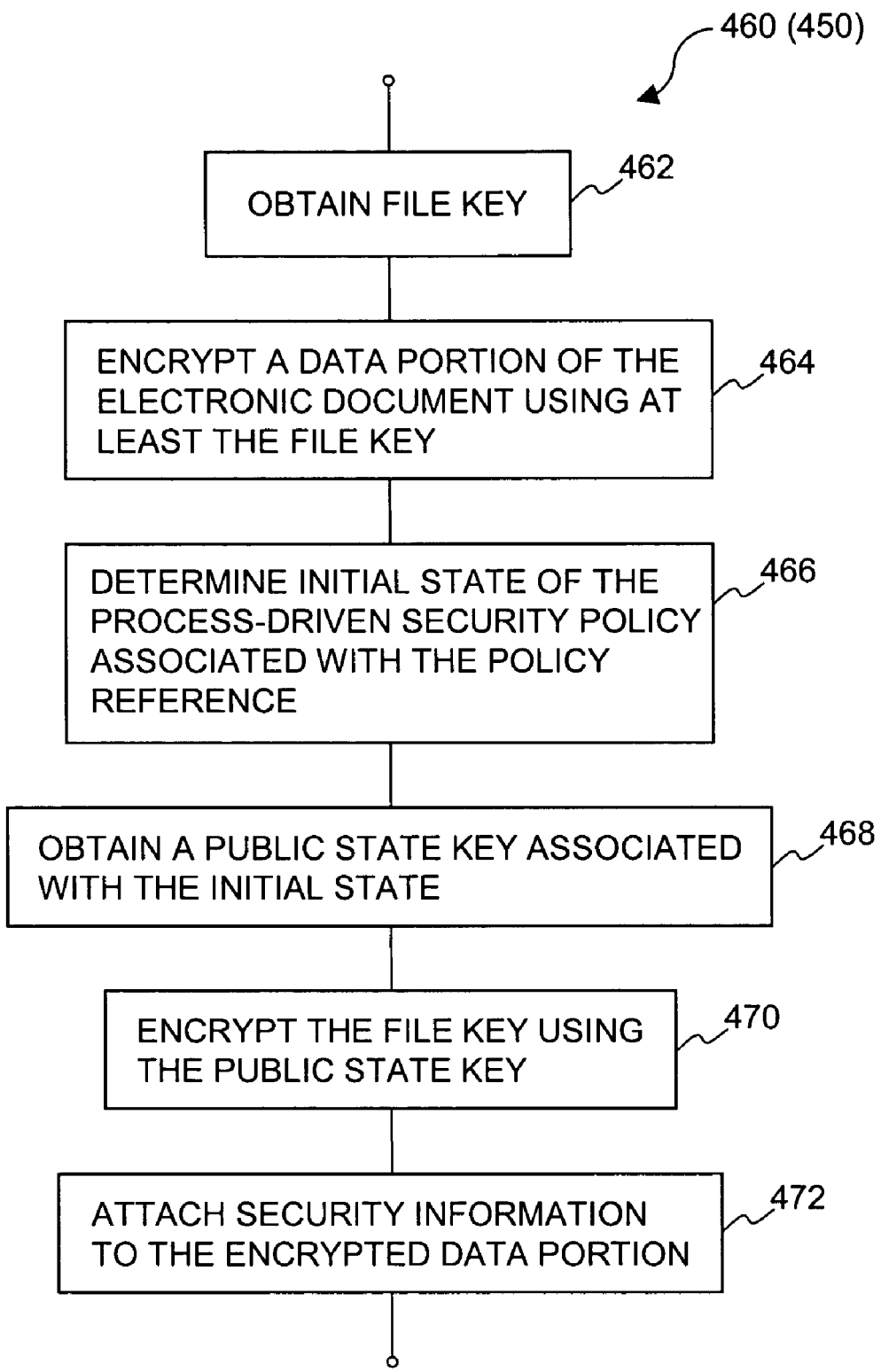
FIG. 4C is a detailed flow diagram of an encryption process according to one embodiment of the invention.

FIG. 4C is a detailed flow diagram of an encryption process 460 according to one embodiment of the invention. The encryption process 460 is, for example, processing suitable for being performed by the block 450 shown in FIG. 4B in which an electronic document is secured in accordance with a process-driven security policy.

According to the encryption process 460, a file key is obtained 462. In one implementation, the file key is a symmetric key used to encrypt and decrypt a data portion of a secured document. After the file key is obtained 462, the data portion of the electronic document is then encrypted 464 using at least the file key.

In one embodiment, each of the different states of the process-driven security policy would include a different public state key that would be used to encrypt documents being placed into such state. An initial state of the process-driven security policy associated with the policy reference is then determined 466. Next, a public state key associated with the initial state is obtained 468. Typically, the public state key is a public key of a public and private cryptography key pair that is to be utilized to encrypt documents associated with the initial state of the process-driven security policy. Once the public state key associated with the initial state has been obtained 468, the file key is encrypted 470 using the public state key. Thereafter, security information is attached 472 to the encrypted data portion. The security information, for example, can include the policy reference and the encrypted file key. For example, the policy reference can be used as a state indicator to identify the applicable state of the process-driven security policy.

In one embodiment, the policy reference has a key pair associated therewith. The file (document) security system (e.g., server) maintains the current state of the process-driven security policy associated with the policy reference. The public key in this pair is used to encrypt the document and bind it with the process-driven security policy.

In this implementation, the electronic document has at least a data portion and a security information portion. The data portion is encrypted using at least the file key. In one embodiment, the electronic document can be encrypted many times over such that a plurality of different keys are needed to encrypt (and consequently to decrypt) the electronic document. In another embodiment, a key used to encrypt the electronic document can be encrypted many times over after being used to encrypt the electronic document. In other words, although the document securing process 440 refers to encryption of the data portion through use of the file key and then encryption of the file key through use of the public state key, it should be understood that additional keys can be used to directly encrypt the electronic document, or indirectly encrypt the electronic document by encrypting a key used to encrypt the electronic document. For example, the additional keys might include one or more of a classifier key, a user or group key, or a security clearance level key.

The security information is typically provided in a header (or header portion) of the electronic document. The header is thus typically attached to the encrypted data portion. The header together with the encrypted data portion represents a secured electronic document. Typically, the security information would include access rules, a policy reference (classifier), a private state key and at least one key (e.g., file key). The at least one key can be encrypted by a public state key that corresponds to the state, as well as possibly one or more other keys. The at least one key is often secured by encrypting either the at least one key itself, or the security information more generally, through use of one or more various other keys (e.g., group key, content type key, and/or clearance key).

Figure 5A:
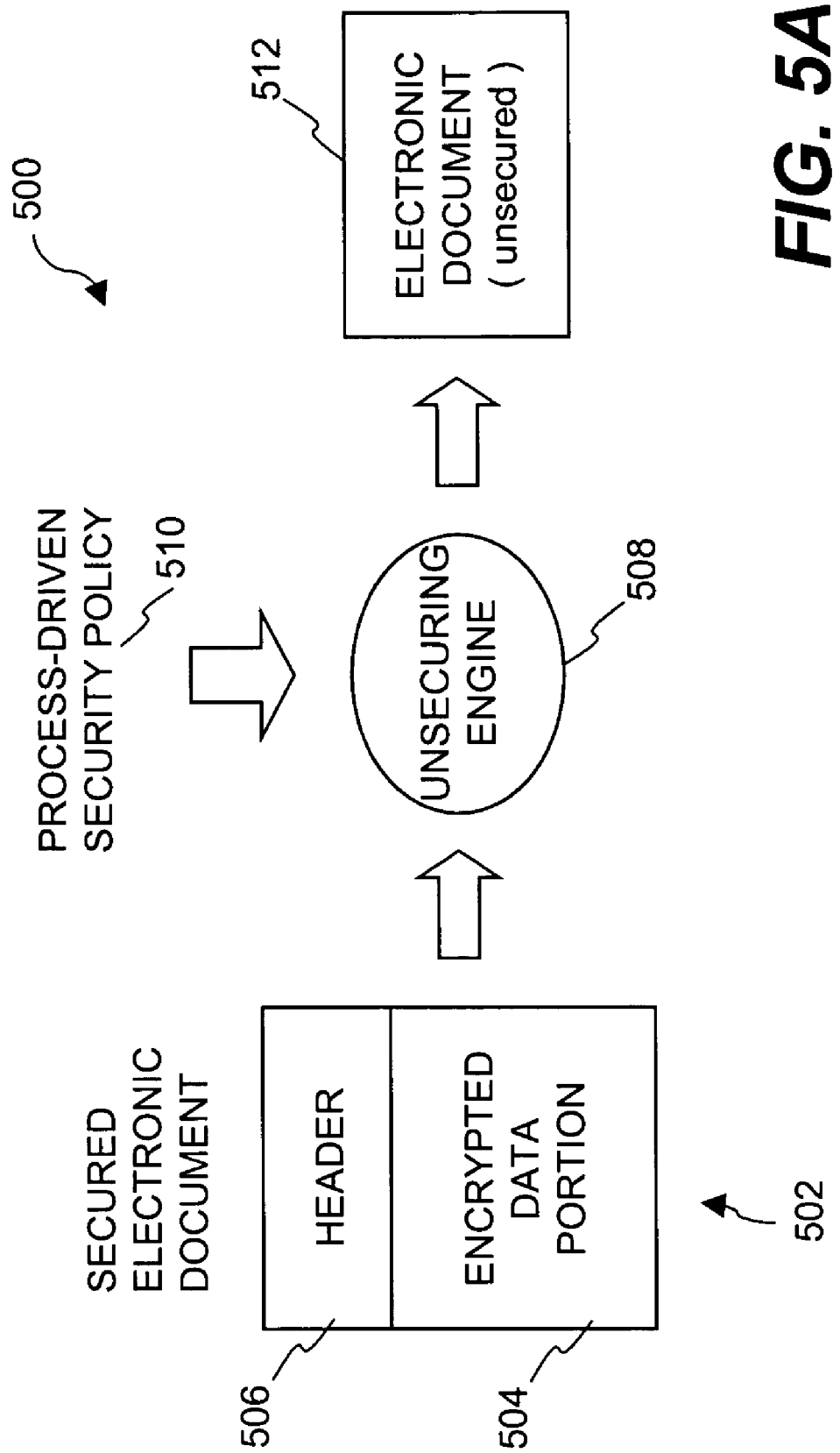
FIG. 5A is a diagram of a document unsecuring system according to one embodiment of the invention.

FIG. 5A is a diagram of a document unsecuring system 500 according to one embodiment of the invention. The document unsecuring system 500 represents a counterpart to the document securing system 400 illustrated in FIG. 4A.

The document unsecuring system 500 cooperates to receive a secured electronic document 502. The secured electronic document typically includes an encrypted data portion 504 and a header 506. Often, but not necessarily, the header 506 is encrypted. The header 506 includes a policy reference and at least one key, e.g., a file key, that is needed to decrypt the encrypted data portion 504. The secured electronic document 502 is supplied to an unsecuring engine 508. The unsecuring engine 508 examines the header 506 of the secured electronic document 502 to determine the policy reference. The policy reference identifies a process-based security policy 510, or a state thereof, that governs the security of the secured document 502. The unsecuring engine 508 also receives at least that portion of the process-based security policy that pertains to the state of the secured electronic document 502. In other words, the unsecuring engine 508 needs the access restrictions for the current state of the process-driven security policy 510 to unsecure the secured electronic document 502, and thus gain access to its contents. The unsecuring engine 508 then evaluates whether the secured electronic document 502 is permitted to be accessed by the requester, based on the access restrictions so retrieved. When the unsecuring engine 508 determines that the requestor is authorized to access the secured electronic document 502, then the unsecuring engine 508 can decrypt the encrypted data portion 504 of the secured electronic document 502 (and also eliminate at least significant portions of the header 506) to yield an electronic document 512 that is unsecured. In other words, the electronic document 512 is primarily (or exclusively) composed of the data portion of the encrypted data portion 504 after such has been decrypted. The decryption can involve the use of a number of keys (e.g., private keys) and decryption algorithms, one of such keys is the file key of the secured electronic document, and another of such keys is the private state key for the state of the secured electronic document.

Figure 5B:
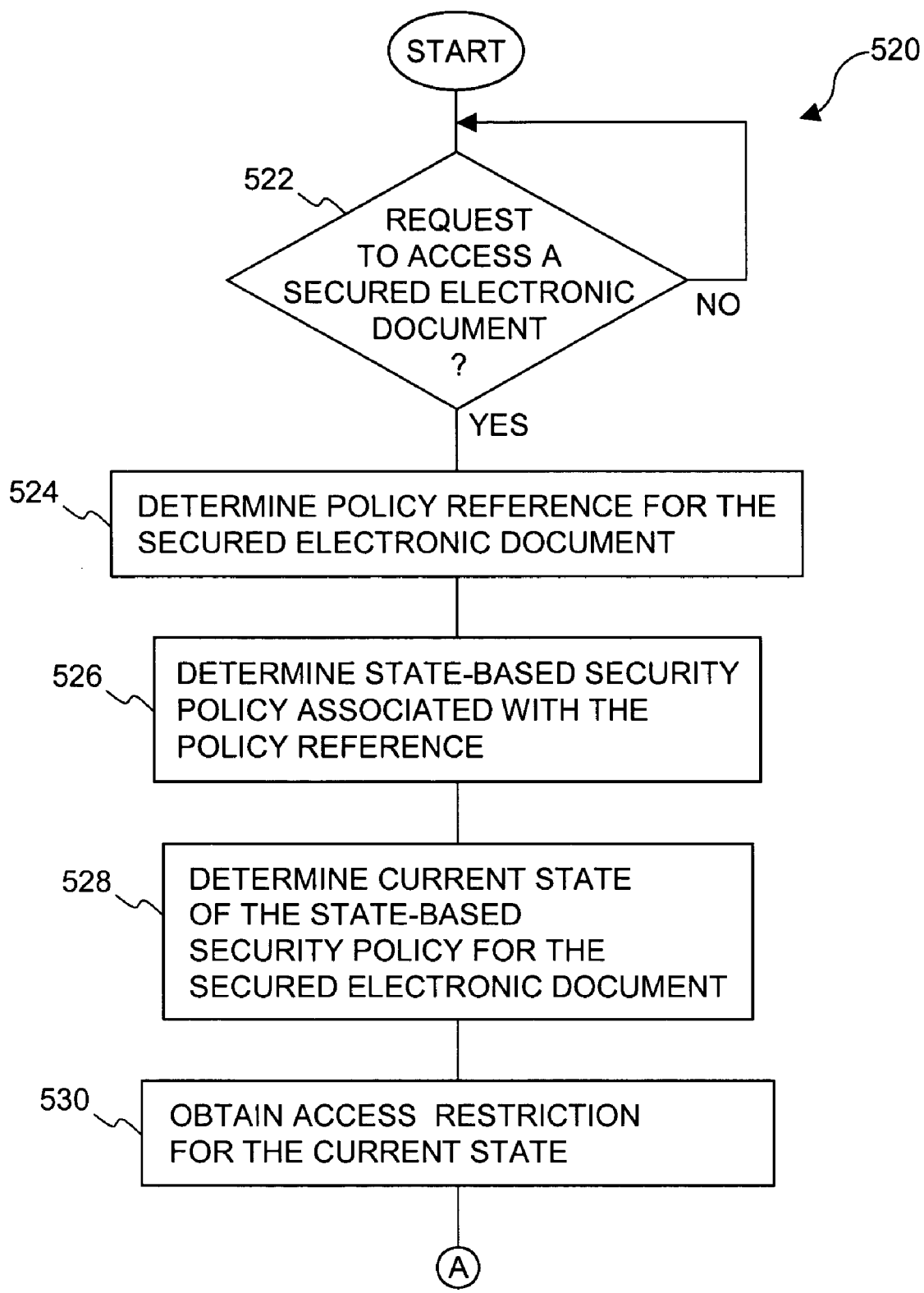
FIGS. 5B and 5C are flow diagrams of a document access process according to one embodiment of the invention.
Figure 5C:
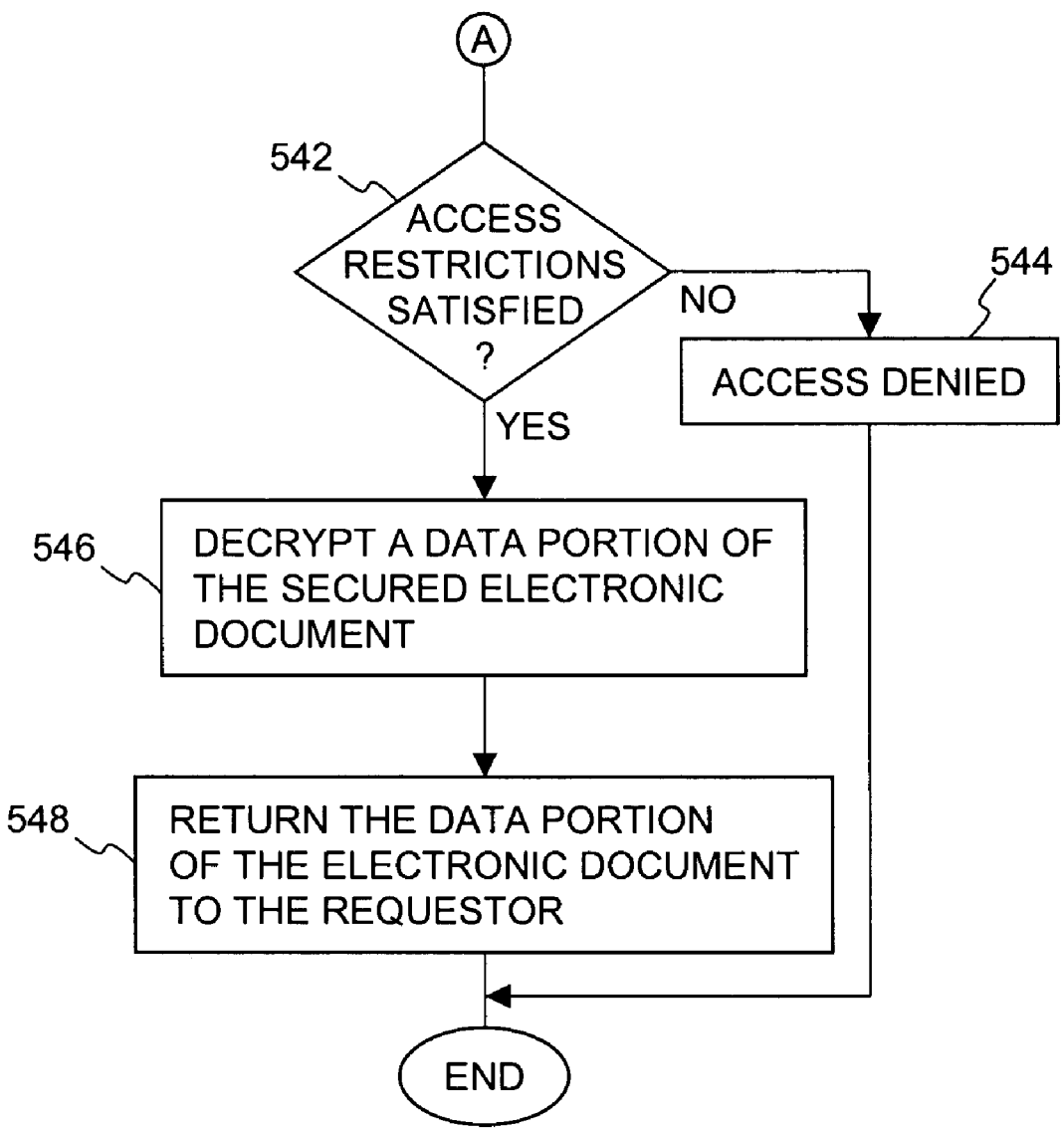

FIGS. 5B and 5C are flow diagrams of a document access process 520 according to one embodiment of the invention. The document access process 520 operates to determine whether access to a particular document is permitted to a particular user (or group of users). The document access process 520 begins with a decision 522 that determines whether a request to access a secured electronic document has been received. When the decision 522 determines that such a request has not yet been received, the document access process 520 awaits such a request. Once the decision 522 determines that a request to access a secured electronic document has been received, the document access process 520 continues. In other words, the document access process 520 can be considered to be invoked once a request to access a secured electronic document has been received.

In any case, once a request to access a secured electronic document has been received, a policy reference for the secured electronic document to be accessed is determined 524. In one embodiment, the security information portion of a secured electronic document contains the policy reference.

Next, a process-driven security policy associated with the policy reference is determined 526. Then, the current state of the process-driven security policy for the secured electronic document is determined 528. In one embodiment, the policy reference (or other indicator) can indicate the current state of the state-based security policy. Next, access restriction are obtained 530 for the current state. Each of the different states of the process-driven security policy often has a different access restriction. Here, the state policy restrictions are those restrictions associated with the current state of a process-driven security policy.

Thereafter, a decision 542 determines whether the state policy restrictions are satisfied. In other words, the secured electronic document to be accessed is presently in the current state of the process-driven security policy. This current state has the access restriction associated therewith, that must be satisfied in order to gain access to the secured electronic document. Hence, the decision 542 determines whether the access restriction is satisfied by the requestor (e.g., user or group of users) seeking access to the secured electronic document. When the decision 542 determines that the access restriction is not satisfied, access to the secured electronic document is denied 544.

On the other hand, when the decision 542 determines that the access restriction has been satisfied, then a data portion of the secured electronic document is decrypted 546. Then, the data portion of the electronic document is returned 548 to the requestor. Following the block 548, as well as following the block 544, the document access process 520 ends.

Figure 5D:
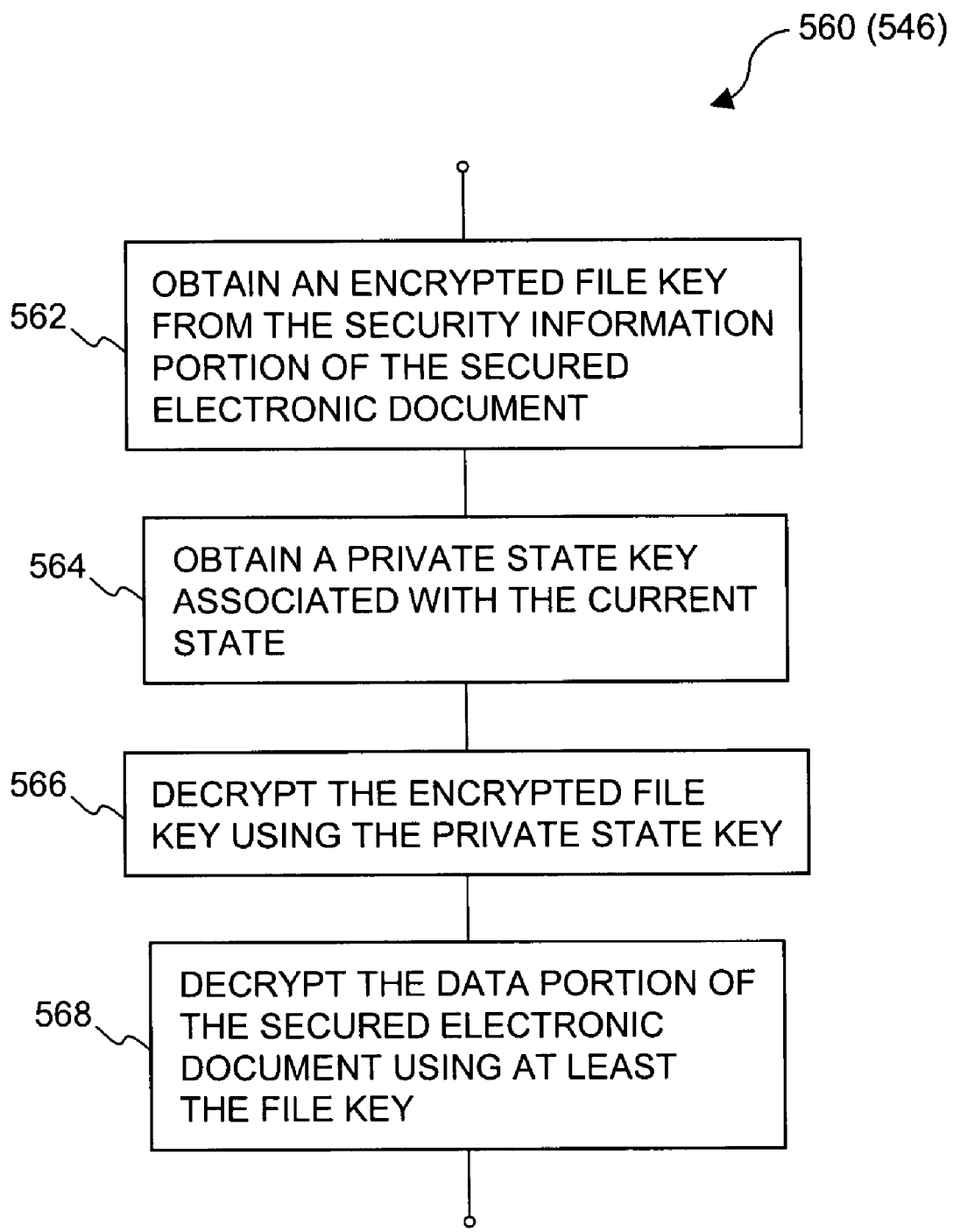
FIG. 5D is a flow diagram of a decryption process according to one embodiment of the invention.

FIG. 5D is a flow diagram of a decryption process 560 according to one embodiment of the invention. The decryption process 560 can, for example, pertain to detailed operations performed by the block 546 illustrated in FIG. 5C. In any event, the decryption process 560 initially obtains 562 an encrypted file key from the security information portion of the secured electronic document. In addition, a private state key associated with the current state of the process-driven security policy for the secured electronic document is obtained 564. Normally, only authorized users would be able to gain access to the private state key. The private state key is the private key of the same public and private cryptography key pair that provided the public state key that was used to encrypt the file key. Then, the encrypted file key is decrypted 566 using the private state key. Thereafter, the data portion of the secured electronic document is decrypted 568 using at least the file key. Consequently, the data portion of the secured electronic document is decrypted and is in the "clear" and thus usable by the requester. Following the block 568, the decryption process 560 is complete and ends.

Figure 6:
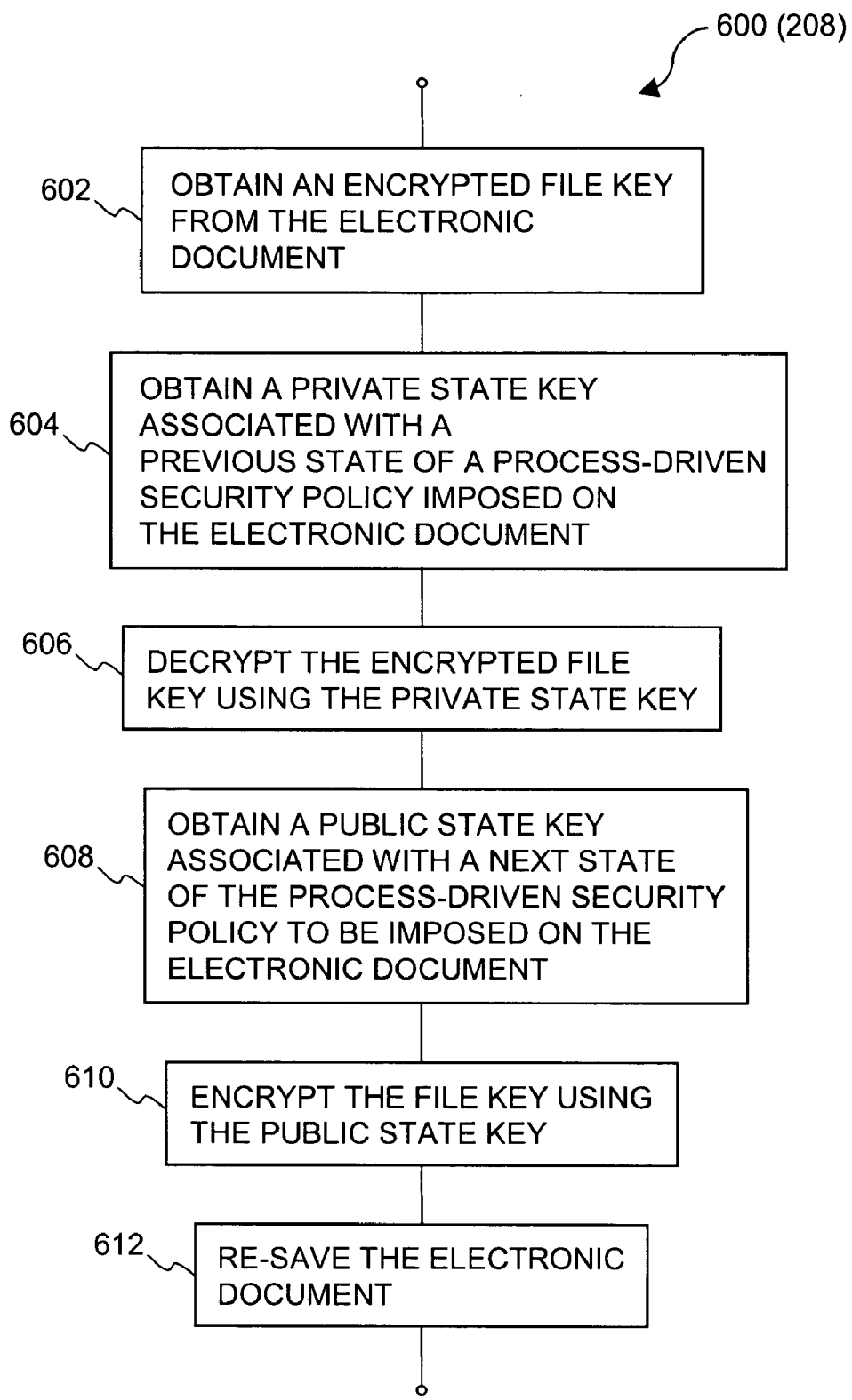
FIG. 6 is a flow diagram of a transition process according to one embodiment of the invention.

FIG. 6 is a flow diagram of a transition process 600 according to one embodiment of the invention. The transition process 600 pertains to processing that can be utilized to transition between states of a process-driven security policy. More particularly, the transition process 600 is, for example, suitable for use as the processing performed by the block 208 illustrated in FIG. 2.

The transition process 600 initially obtains 602 an encrypted file key from the electronic document. Typically, the encrypted file key would be retrieved from the security information portion of the electronic document. Then, a private state key is obtained 604. Here, the private state key is associated with a previous state of a process-driven security policy that is imposed on the electronic document. After the private state key has been obtained 604, the encrypted file key is decrypted 606 using the private state key. At this point, the file key has been decrypted and could be used to decrypt the data portion of the electronic document. However, the file key is instead re-encrypted in accordance with a next (current) state. More specifically, a public state key is then obtained 608. The public state key is associated with the next state of the state-based security policy that is to be imposed on the electronic document. Then, using the public state key, the file key can be encrypted 610. Thereafter, the electronic document is re-saved 612. By re-saving 612 the electronic document, the security information portion of the electronic document is updated to include the new encrypted file key in accordance with the next state (or current state). Note that the data portion of the electronic document (which is secured by the file key) advantageously need not be decrypted in the transition process 600; instead, the encryption of the file key is changed whenever a state transition occurs. Following the block 612, the transition process 600 is complete.

In one embodiment, to effect a state transition, the user only needs permission to effect the state transition. Additionally, users authorized to effect state changes with respect to a document, might be quite different from users authorized to access the document.

Figure 7:
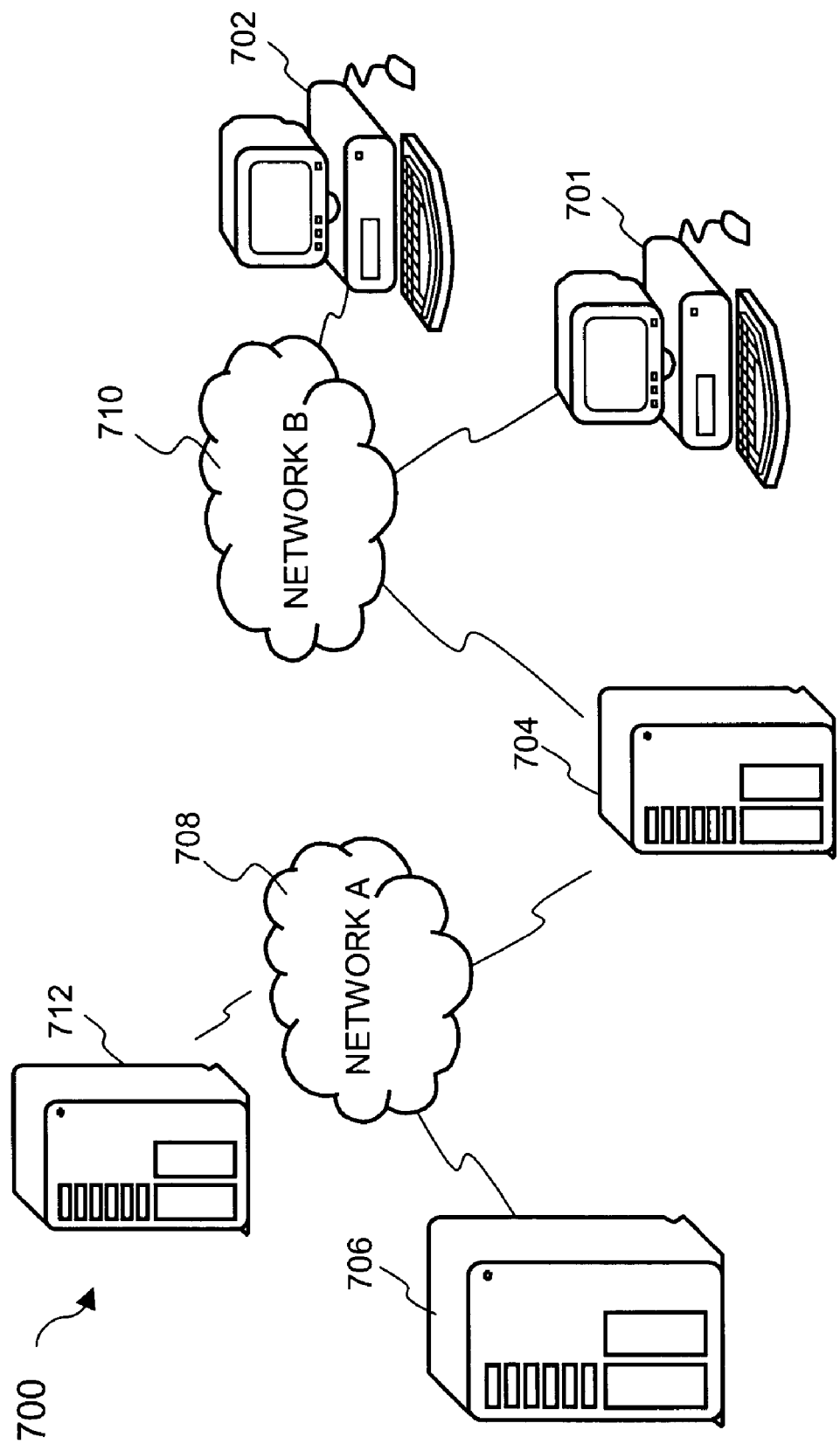
FIG. 7 shows a basic security system in which the invention may be practiced in accordance with one embodiment thereof.

FIG. 7 shows a basic security system 700 in which the invention may be practiced in accordance with one embodiment thereof. The security system 700 may be employed in an enterprise or inter-enterprise environment. It includes a first server 706 (also referred to as a central server) providing centralized access management for the enterprise. The first server 706 can control restrictive access to files secured by the security system 700. To provide dependability, reliability and scalability of the system, one or more second servers 704 (also referred to as local servers, of which one is shown) may be employed to provide backup or distributed access management for users or client machines serviced locally. The server 704 is coupled to a network 708 and a network 710. For illustration purposes, there are two client machines 701 and 702 being serviced by the local server 704. Alternatively, one of the client machines 701 and 702 may be considered as a networked storage device.

Secured files may be stored in any one of the devices 701, 702, 704 and 706. When a user of the client machine 701 attempts to exchange a secured file with a remote destination 712 being used by an external user, one or more of the processing 300, 400, 500 and 600 discussed above are activated to ensure that the requested secure file is delivered without compromising the security imposed on the secured file.

According to one embodiment, a created document is caused to go through an encryption process that is preferably transparent to a user. In other words, the created document is encrypted or decrypted under the authoring application so that the user is not aware of the process. One or more keys, such as a state key, a user key and/or a content type key, can be used to retrieve a file key to decrypt an encrypted document. Typically, the user key is associated with an access privilege for the user or a group of users, and the content type key is associated with the type of content of the created document. For a given secured document, only a user with proper access privileges can access the secured document.

In one setting, a secured document may be uploaded via the network 710 from the client computer 701 to a computing or storage device 702 that may serve as a central repository. Although not necessary, the network 710 can provide a private link between the computer 701 and the computing or storage device 702. Such link may be provided by an internal network in an enterprise or a secured communication protocol (e.g., VPN and HTTPS) over a public network (e.g., the Internet). Alternatively, such link may simply be provided by a TCP/IP link. As such, secured documents on the computer 702 may be remotely accessed.

In another setting, the computer 701 and the computing or storage device 702 are inseparable, in which case the computing or storage device 702 may be a local store to retain secured documents or receive secured network resources (e.g., dynamic Web contents, results of a database query, or a live multimedia feed). Regardless of where the secured documents or secured resources are actually located, a user, with proper access privileges, can access the secured documents or resources from the client computer 701 or the computing or storage device 702 using an application (e.g., Microsoft Internet Explorer, Microsoft Word or Adobe Acrobat Reader).

Accordingly, respective local modules in local servers, in coordination with the central server, form a distributed mechanism to provide distributed access control enforcement. Such distributed access control enforcement ensures the dependability, reliability and scalability of centralized access control management undertaken by the central server for an entire enterprise or a business location.

FIG. 8 shows an exemplary data structure 820 of a secured file that may be used in one embodiment of the invention. The data structure 820 includes two portions: a header (or header portion) 822 and encrypted data (or an encrypted data portion) 824. The header 822 can be generated in accordance with a security template associated with a data store and thus provides restrictive access to the data portion 824 which is an encrypted version of a plain file. Optionally, the data structure 820 may also include an error-checking portion 825 that stores one or more error-checking codes, for example, a separate error-checking code for each block of encrypted data 824. These error-checking codes may also be associated with a Cyclical Redundancy Check (CRC) for the header 822 and/or the encrypted data 824. The header 822 includes a flag bit or signature 827 and security information 826 that is in accordance with the security template for the store. According to one embodiment, the security information 826 is encrypted and can be decrypted with a user key associated with an authenticated user (or requester).

The security information 826 can vary depending upon implementation. However, as shown in FIG. 8, the security information 826 includes a user identifier (ID) 828, access policy (access rules) 829, a file key 830, a classifier 831 and other information 832. Although multiple user identifiers may be used, a user identifier 828 is used to identify a user or a group that is permitted to access the secured file. The access rules 829 provide restrictive access to the encrypted data portion 824. The file key 830 is a cipher key that, once obtained, can be used to decrypt the encrypted data portion 824 and thus, in general, is protected. In one implementation of the data structure 820, the file key 830 is encrypted in conjunction with the access rules 829. In another implementation of the data structure 820, the file key 830 is encrypted with a private state key and further protected by the access rules 829. The other information 832 is an additional space for other information to be stored within the security information 826. For example, the other information 832 may be used to include other information facilitating secure access to the secured file, such as version number or author identifier.

The invention is preferably implemented by software or a combination of hardware and software, but can also be implemented in hardware. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The various embodiments, implementations and features of the invention noted above can be combined in various ways or used separately. Those skilled in the art will understand from the description that the invention can be equally applied to or used in various other settings with respect to different combinations, embodiments, implementations or features as provided in the description herein.

The invention may be practiced in two broad approaches: one, where document move asynchronously through a persistent workflow (here, the state changes are typically triggered by the users); and two, where documents move synchronously through a single-use workflow, a plurality of which however can be initiated from a workflow template (here, the state changes are typically due to administrator central command). The two approaches may be combined for use in a single enterprise. State changes due to external events may occur with both approaches.

The advantages of the invention are numerous. Different embodiments or implementations may yield one or more of the following advantages. One advantage of the invention is that file security systems are able to automatically enforce process-driven security policies on files (e.g., documents). The automatic nature of the enforcement of the process-driven security policies alleviates otherwise excessive burdens on an administrator. Another advantage of the invention is that changing of the security policies for files (e.g., documents) in accordance with a process allows greater flexibility in utilizing security policies. Still another advantage of the invention is that the process-driven security policies can be enforced centrally or locally. Still another advantage is that a workflow ordered through a centralized document management system (DMS) may be extended to a plurality of documents stored in a distributed fashion, thereby allowing a system administrator to use the well-known DMS interface.

The foregoing description of embodiments is illustrative of various aspects/embodiments of the present invention. Various modifications to the invention can be made to the preferred embodiments by those skilled in the art without departing from the true spirit and scope of the invention as defined by the appended claims. Accordingly, the scope of the present invention is defined by the appended claims rather than the foregoing description of embodiments.

What is claimed is:

1. A document security system for restricting access to secured documents, the system comprising:

a processor;

a policy system configured to enable the processor to store at least one process-driven security policy on a computer readable storage medium, wherein the process-driven security policy includes a plurality of different states and transition rules, wherein each of the different states is associated with one or more access restrictions, wherein at least one of the different states has distinct access restrictions for secured documents which reside in that state, and wherein the transition rules specify circumstances under which a secured document is to transition from one state to another, wherein the secured document includes at least a security information portion and an encrypted data portion, the security information portion including at least an encrypted file key, wherein the circumstances include the occurrence of internal and external events, wherein the external events originate from outside the policy system and wherein in response to detecting a transition from a previous state of the process-driven security policy for the secured document to a current state, the secured document is modified by decrypting the file key and then re-encrypting the file key, whereby the file key is encrypted differently for the current state than the previous state;

wherein the policy system is configured to enable the processor to provide a reference to the process-driven security policy to a client computer, the reference referring to the process-driven security policy and an accessor user list resident on the policy system; and an access manager configured to enable the processor to access the process-driven security policy and determine whether a requestor is permitted to access a secured document based on the policy state associated therewith at the time access is requested, the requestor being listed in the accessor user list, and the corresponding one or more access restrictions thereof for the process-driven security policy.

2. The document security system as recited in claim 1, wherein the one or more access restrictions for the secured document are automatically changed in response to detecting a change in the state of the process-driven security policy for the secured document.

3. The document security system as recited in claim 1, wherein events cause the state of the process-driven security policy for the secured document to automatically transition from one state to another.

4. The document security system as recited in claim 3, wherein the internal events originate from the document security system and wherein external events originate from outside the document security system.

5. The document security system as recited in claim 4, wherein at least one of the external events originates from a document management system.

6. The document security system as recited in claim 1, wherein one or more of the corresponding one or more access restrictions for access to the secured document remain intact when the state of the process-driven security policy for the secured document changes.

7. The document security system as recited in claim 1, wherein events cause the state of the process-driven security policy to automatically transition from one state to another, wherein the process-driven security policy includes at least a first state, a second state, and a third state, and wherein a first event causes transition from the first state to the second state, and a second event causes transition from the second state to a third state.

8. The document security system as recited in claim 1, wherein events cause the state of the process-driven security policy to automatically transition from one state to another, wherein the process-driven security policy includes at least a first state and a second state, and wherein a first event causes transition from the first state to the second state.

9. The document security system as recited in claim 1, wherein the external events originate from a second document security system.

10. The document security system as recited in claim 9, wherein the transition rules are written in XML.

11. The document security system as recited in claim 1, wherein events cause the state of the process-driven security policy for the secured document to transition from a previous state to a current state, and wherein the secured document is modified in response to detecting a transition from the previous state of the process-driven security policy for the secured document to the current state.

12. The document security system as recited in claim 11, wherein the file key is decrypted in order to decrypt the encrypted data portion.

13. The document security system as recited in claim 11, wherein, in response to determining, by the access manager, that access to a secured document is permitted by a requestor, access to the secured document is available at a client machine associated with the requestor.

14. A method for transitioning at least one secured document through a security-policy state machine having a plurality of different states, each of the plurality of different states having distinct access restrictions for secured documents which reside in that state, the method comprising:

receiving an event, wherein the event is one of a group of internal and external events, wherein the external events originate from outside the security-policy state machine;

determining whether the event causes a state transition for the at least one secured document from a former state to a subsequent different state of the security-policy state machine;

automatically transitioning from the former state to the subsequent different state of the security-policy state machine in response to determining that the event causes the state transition, wherein the at least one secured document includes at least a security information portion and an encrypted data portion, the security information portion including at least an encrypted file key, and wherein the transitioning comprises modifying the at least one secured document by decrypting the encrypted file key and then re-encrypting the file key, whereby the file key is encrypted differently for the current state than the former state; and providing a reference to the security-policy state machine to a client computer, the reference referring to a current state of the security-policy state machine and an accessor user list resident in the security-policy state machine.

15. The method as recited in claim 14, wherein the security-policy state machine implements a process-driven security policy, and wherein each state of the security-policy state machine has different access restrictions.

16. The method as recited in claim 14, wherein each of the states of the security-policy state machine have different access policies.

17. The method as recited in claim 16, wherein the security-policy state machine is provided as part of a document security system, and wherein the different access policies of the security-policy state machine are enforced by the document security system.

18. The method as recited in claim 14, wherein the transitioning comprises modifying the secured document to reflect the subsequent state of the security-policy state machine.

19. The method as recited in claim 14, wherein the transitioning further comprises:

retrieving the encrypted file key from the secured document;

decrypting the encrypted file key to yield the file key;

subsequently encrypting the file key in accordance with the subsequent state of the security-policy state machine; and storing the secured document, the secured document including at least an encrypted data portion and the subsequently encrypted file key.

20. The method as recited in claim 14, wherein the transitioning further comprises:

retrieving the encrypted file key from the secured document;

obtaining a private state key associated with the former state of the security-policy state machine;

decrypting the encrypted file key using the private file key;

obtaining a public state key associated with the subsequent state of the security-policy state machine;

subsequently encrypting the file key in accordance with the public state key; and storing the secured document, the secured document including at least an encrypted data portion and the subsequently encrypted file key.

21. A method for imposing access restrictions on electronic documents, the method comprising:

providing at least one process-driven security policy at a server computer, wherein the process-driven security policy is associated with a plurality of different states, and wherein each of the different states has distinct access restrictions for secured documents which reside in that state;

providing a reference to the process-driven security policy to a client computer, the reference referring to the process-driven security policy and an accessor user list resident on the server computer;

associating the reference to an electronic document;

transitioning the process-driven security policy from one state to a current state in response to the occurrence of an event, wherein the event is one of a group of internal and external events, wherein the external events are external to the server computer, wherein the electronic document includes at least a security information portion and an encrypted data portion, the security information portion including at least an encrypted file key, and wherein the transitioning comprises modifying the electronic document by decrypting the encrypted file key and then re-encrypting the file key, whereby the file key is encrypted differently for the current state than the former state; and subsequently determining at the server computer whether a requestor is permitted to access the electronic document, the access being based on a current state of the process-driven security policy and the requestor being listed in the accessor user list, the current state being informed to the server computer by sending the reference to the server computer.

22. The method as recited in claim 21, wherein the external events originate from a system external to the server computer.

23. The method as recited in claim 22, wherein the transitioning is performed at the server computer.

24. The method as recited in claim 21, wherein the associating associates the reference to a group of documents.

25. The method as recited in claim 21, wherein the method pertains to a group of electronic documents, and wherein all of the electronic documents of the group are always in the same state of the process-driven security policy.

26. The method as recited in claim 21, wherein the determining comprises evaluating the process-driven security policy of an electronic document at the server computer based on at least the security policy restrictions for the current state of the process-driven security policy for the electronic document.

27. A non-transitory computer readable storage medium having instructions stored thereon, the instructions comprising:

instructions to detect an occurrence of an event, wherein the event is one of a group of internal and external events;

instructions to determine whether the event causes a state transition for at least one secured document from a former state to a subsequent different state of a security-policy state machine having a plurality of different states, each of the plurality of different states having distinct access restrictions for secured documents which reside in that state; and instructions to automatically transition from the former state to the subsequent different state of the security-policy state machine upon determining that the event causes the state transition, wherein the external events originate from outside the security-policy state machine, and wherein the at least one secured document includes at least a security information portion and an encrypted data portion, the security information portion including at least an encrypted file key, and wherein the transitioning comprises modifying the at least one secured document by decrypting the encrypted file key and then re-encrypting the file key, whereby the file key is encrypted differently for the current state than the former state; and instructions to provide a reference to the process-driven security policy to a client machine, wherein the reference refers to the process-driven security policy and an accessor user list resident in the security-policy state machine.

28. A non-transitory computer readable storage medium having instructions stored thereon, the instructions comprising:

instructions to provide at least one process-driven security policy at a server machine, wherein the process-driven security policy has a plurality of different states and transition rules associated therewith, wherein each of the different states has distinct access restrictions for secured documents which reside in that state, wherein the transition rules specify circumstances under which an electronic document is to transition from one state to another, wherein the circumstances include the occurrence of internal and external events, wherein the external events originate from outside the server machine, and wherein the at least one secured document includes at least a security information portion and an encrypted data portion, the security information portion including at least an encrypted file key, and wherein the transitioning comprises modifying the at least one secured document by decrypting the encrypted file key and then re-encrypting the file key, whereby the file key is encrypted differently for the current state than the former state;

instructions to provide a reference to the process-driven security policy to a client machine, wherein the reference refers to the process-driven security policy and an accessor user list resident on the server machine;

instructions to associate the reference to an electronic document;

instructions to transform the process-driven security policy from one state to a current state; and instructions to determine at the server computer whether a requestor is permitted to access the electronic document, wherein the access is based on a current state of the process-driven security policy and the requestor being listed in the accessor user list, and wherein the current state is informed to the server computer by sending the reference to the server computer.

\* \* \* \* \*

UNITED STATES PATENT AND TRADEMARK OFFICE
CERTIFICATE OF CORRECTION

| | | |
|---|---|---|
| PATENT NO. | : 8,127,366 B2 | Page 1 of 1 |
| APPLICATION NO. | : 10/676474 | |
| DATED | : February 28, 2012 | |
| INVENTOR(S) | : Vainstein et al. | |

It is certified that error appears in the above-identified patent and that said Letters Patent is hereby corrected as shown below:

Page 6, item (56), under "Other Publications", in Column 2, Line 48, delete "Ep 02 25 8530," and insert -- EP 02 25 8530, --.

Page 6, item (56), under "Other Publications", in Column 2, Line 67, delete ""Encryping" and insert -- "Encrypting --.

Page 7, item (56), under "Other Publications", in Column 1, Line 3, delete "Encryping" and insert -- Encrypting --.

Page 7, item (56), under "Other Publications", in Column 1, Line 6, delete "Encryping" and insert -- Encrypting --.

Page 7, item (56), under "Other Publications", in Column 1, Line 9, delete "Encryping" and insert -- Encrypting --.

Page 7, item (56), under "Other Publications", in Column 1, Line 35, delete "Application No." and insert -- Appl. No. --.

Page 7, item (56), under "Other Publications", in Column 2, Line 6, delete "/how-ssi-security-" and insert -- /how-ssl-security- --.

Page 7, item (56), under "Other Publications", in Column 2, Line 15, delete "Windows Oct. 2002 Oct. 15, 2002" and insert -- Windows Oct. 2002, Oct. 15, 2002 --.

Signed and Sealed this
Twenty-eighth Day of August, 2012

David J. Kappos
*Director of the United States Patent and Trademark Office*